US012711302B1

(12) United States Patent
Agrawal et al.

(10) Patent No.: US 12,711,302 B1
(45) Date of Patent: Aug. 18, 2026

(54) GENERATION OF ELECTRONIC DATA FOR USER INTERFACE CAPTURE

(71) Applicant: DocuSign, Inc., San Francisco, CA (US)

(72) Inventors: Palash Agrawal, San Francisco, CA (US); Stephen Parish, Renton, WA (US)

(73) Assignee: Docusign, Inc., San Francisco, CA (US)

( * ) Notice: Subject to any disclaimer, the term of this patent is extended or adjusted under 35 U.S.C. 154(b) by 211 days.

(21) Appl. No.: 18/498,937

(22) Filed: Oct. 31, 2023

(51) Int. Cl.
*G06F 40/106* (2020.01)
*G06F 40/109* (2020.01)
*G06F 40/166* (2020.01)
*G06F 40/197* (2020.01)

(52) U.S. Cl.
CPC .......... *G06F 40/106* (2020.01); *G06F 40/109* (2020.01); *G06F 40/166* (2020.01); *G06F 40/197* (2020.01)

(58) Field of Classification Search
CPC .... G06F 40/106; G06F 40/109; G06F 40/166; G06F 40/197
See application file for complete search history.

(56) References Cited

U.S. PATENT DOCUMENTS 7,107,284 B1 * 9/2006 Betz ...................... G06F 16/283
9,251,131 B2 * 2/2016 McCabe ................ G06Q 10/10
10,108,815 B2 * 10/2018 Korneev ............. G06F 21/6245
10,621,371 B1 * 4/2020 Schick .................. G06F 40/166
12,299,381 B1 * 5/2025 Pezeshki ............... G06F 40/151
12,437,317 B2 * 10/2025 Mun .................. G06Q 30/0276
2006/0041506 A1 2/2006 Mason
2008/0097777 A1 4/2008 Rielo
2009/0276471 A1 11/2009 Baer
2009/0292930 A1 * 11/2009 Marano .............. G06F 21/6218 726/28
2011/0173701 A1 * 7/2011 Raley ...................... H04L 67/62 726/26
2013/0080885 A1 * 3/2013 Boyd ............... G05B 19/41875 715/255
2014/0348396 A1 * 11/2014 Laaser ................... G06V 30/40 382/113
2017/0017646 A1 * 1/2017 Kumar .................... G06F 21/00
2017/0052943 A1 * 2/2017 Owens .................. G06F 40/143
2018/0095941 A1 * 4/2018 Ciabarra, Jr. ......... G06F 40/143
(Continued)

FOREIGN PATENT DOCUMENTS

WO WO-2014033747 A2 * 3/2014 ............. G16H 10/20

*Primary Examiner* — Stephen S Hong
(74) *Attorney, Agent, or Firm* — KDW FIRM PLLC

(57) ABSTRACT

A method, a system, and a computer program product for generating and capturing/certifying an interface embedding an electronic document. An electronic document and one or more presentation parameters associated with presentation of the electronic document on a graphical user interface are received. One or more electronic interfaces embedding the electronic document are generated. The electronic interfaces may capture the electronic document in accordance with one or more presentation parameters. One or more electronic interfaces are presented on the graphical user interface with the electronic document embedded in the electronic interfaces. The captured electronic document is stored in one or more storage locations.

18 Claims, 15 Drawing Sheets

(56) References Cited

U.S. PATENT DOCUMENTS

| | | | | |
|---|---|---|---|---|
| 2018/0341626 | A1* | 11/2018 | Williams | G06F 40/106 |
| 2023/0055241 | A1* | 2/2023 | Zionpour | G06F 40/186 |
| 2023/0334240 | A1* | 10/2023 | Shin | G06F 40/197 |
| 2025/0291610 | A1 | 9/2025 | Rane | |

* cited by examiner

Figure 10:
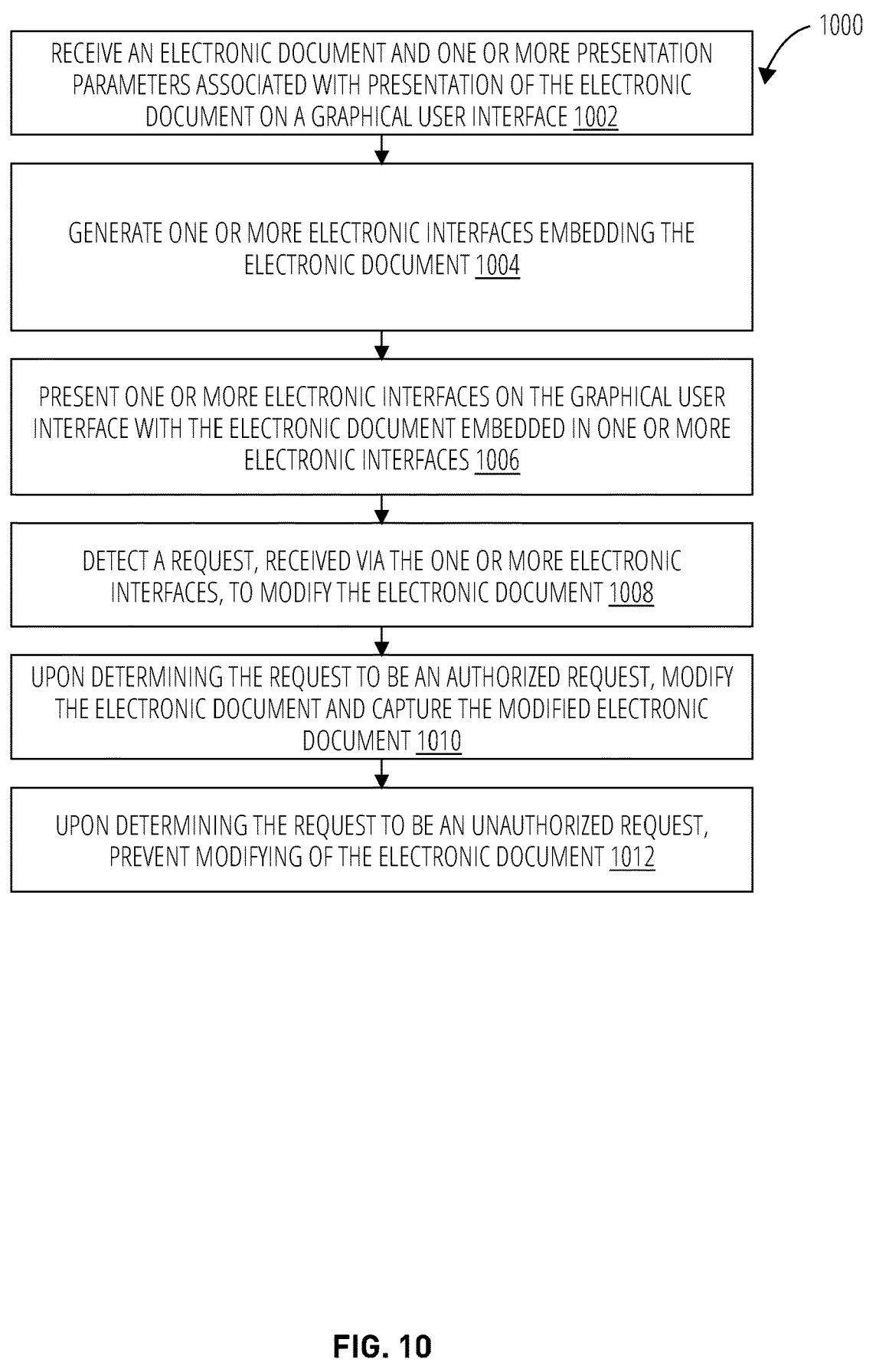

1000

RECEIVE AN ELECTRONIC DOCUMENT AND ONE OR MORE PRESENTATION PARAMETERS ASSOCIATED WITH PRESENTATION OF THE ELECTRONIC DOCUMENT ON A GRAPHICAL USER INTERFACE 1002

GENERATE ONE OR MORE ELECTRONIC INTERFACES EMBEDDING THE ELECTRONIC DOCUMENT 1004

PRESENT ONE OR MORE ELECTRONIC INTERFACES ON THE GRAPHICAL USER INTERFACE WITH THE ELECTRONIC DOCUMENT EMBEDDED IN ONE OR MORE ELECTRONIC INTERFACES 1006

DETECT A REQUEST, RECEIVED VIA THE ONE OR MORE ELECTRONIC INTERFACES, TO MODIFY THE ELECTRONIC DOCUMENT 1008

UPON DETERMINING THE REQUEST TO BE AN AUTHORIZED REQUEST, MODIFY THE ELECTRONIC DOCUMENT AND CAPTURE THE MODIFIED ELECTRONIC DOCUMENT 1010

UPON DETERMINING THE REQUEST TO BE AN UNAUTHORIZED REQUEST, PREVENT MODIFYING OF THE ELECTRONIC DOCUMENT 1012

Figure 11:
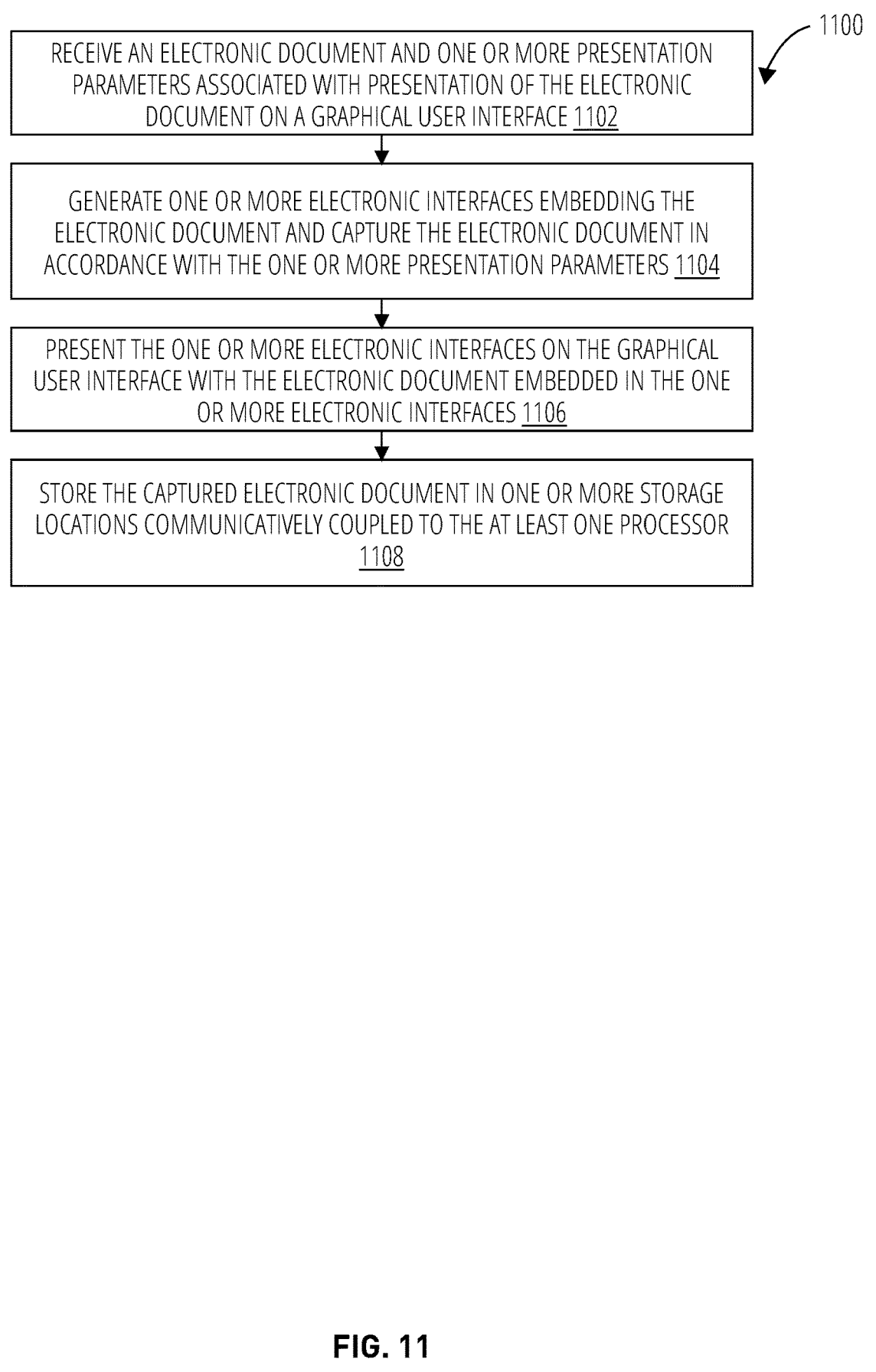

RECEIVE AN ELECTRONIC DOCUMENT AND ONE OR MORE PRESENTATION PARAMETERS ASSOCIATED WITH PRESENTATION OF THE ELECTRONIC DOCUMENT ON A GRAPHICAL USER INTERFACE 1102

GENERATE ONE OR MORE ELECTRONIC INTERFACES EMBEDDING THE ELECTRONIC DOCUMENT AND CAPTURE THE ELECTRONIC DOCUMENT IN ACCORDANCE WITH THE ONE OR MORE PRESENTATION PARAMETERS 1104

PRESENT THE ONE OR MORE ELECTRONIC INTERFACES ON THE GRAPHICAL USER INTERFACE WITH THE ELECTRONIC DOCUMENT EMBEDDED IN THE ONE OR MORE ELECTRONIC INTERFACES 1106

STORE THE CAPTURED ELECTRONIC DOCUMENT IN ONE OR MORE STORAGE LOCATIONS COMMUNICATIVELY COUPLED TO THE AT LEAST ONE PROCESSOR 1108

Figure 12:
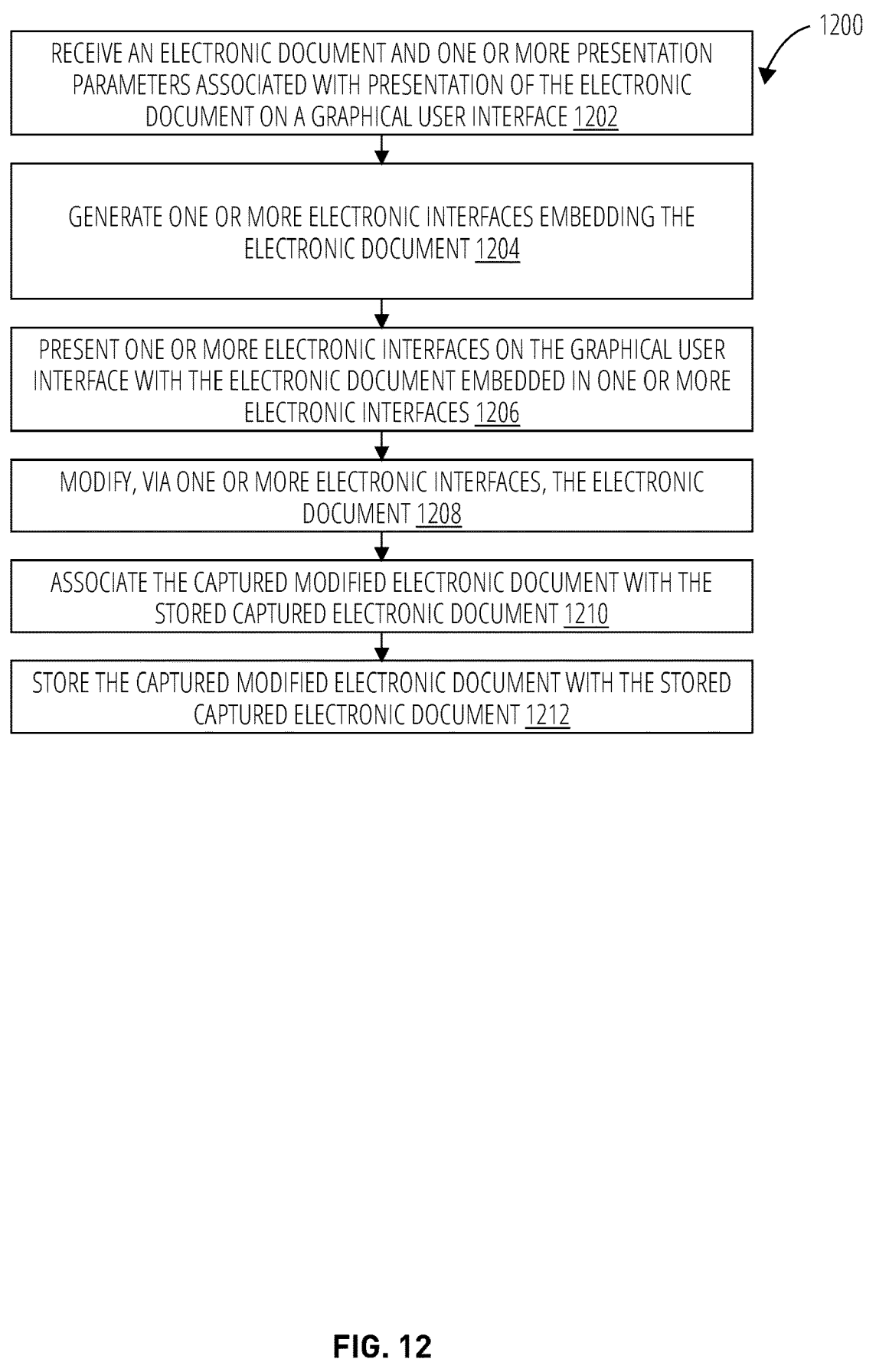

RECEIVE AN ELECTRONIC DOCUMENT AND ONE OR MORE PRESENTATION PARAMETERS ASSOCIATED WITH PRESENTATION OF THE ELECTRONIC DOCUMENT ON A GRAPHICAL USER INTERFACE 1202

GENERATE ONE OR MORE ELECTRONIC INTERFACES EMBEDDING THE ELECTRONIC DOCUMENT 1204

PRESENT ONE OR MORE ELECTRONIC INTERFACES ON THE GRAPHICAL USER INTERFACE WITH THE ELECTRONIC DOCUMENT EMBEDDED IN ONE OR MORE ELECTRONIC INTERFACES 1206

MODIFY, VIA ONE OR MORE ELECTRONIC INTERFACES, THE ELECTRONIC DOCUMENT 1208

ASSOCIATE THE CAPTURED MODIFIED ELECTRONIC DOCUMENT WITH THE STORED CAPTURED ELECTRONIC DOCUMENT 1210

STORE THE CAPTURED MODIFIED ELECTRONIC DOCUMENT WITH THE STORED CAPTURED ELECTRONIC DOCUMENT 1212

COMPUTER-READABLE STORAGE MEDIUM 1302

COMPUTER EXECUTABLE INSTRUCTIONS 1304

FIG. 13

GENERATION OF ELECTRONIC DATA FOR USER INTERFACE CAPTURE

BACKGROUND

An electronic document management platform allows organizations to manage a growing collection of electronic documents, such as electronic agreements. An electronic agreement may be tagged with a visual element for receiving an electronic signature. An electronic signature is data that is logically associated with other data and used by a signatory to sign the associated data. Due to constantly evolving legal and technical requirements imposed on electronic documents, an entire ecosystem of processes, devices, systems and networks continuously evolve around the safe and secure contract lifecycle management (CLM), such as generation, delivery, management, searching and storage of electronic documents. Existing electronic document management systems lack an ability to capture/certify how electronic documents and/or any other data are presented on graphical user interfaces, thereby allow fraudulent transactions to occur.

BRIEF DESCRIPTION OF THE DRAWINGS

To easily identify the discussion of any particular element or act, the most significant digit or digits in a reference number refer to the figure number in which that element is first introduced.

FIG. 10 illustrates an example process for generating and capturing/certifying an interface, according to some implementations of the current subject matter.

FIG. 11 illustrates another example process for generating and capturing/certifying an interface, according to some implementations of the current subject matter.

FIG. 12 illustrates yet another example process for generating and capturing/certifying an interface, according to some implementations of the current subject matter.

FIG. 13 illustrates a computer-readable storage medium in accordance with one embodiment.

DETAILED DESCRIPTION

Figure 1:
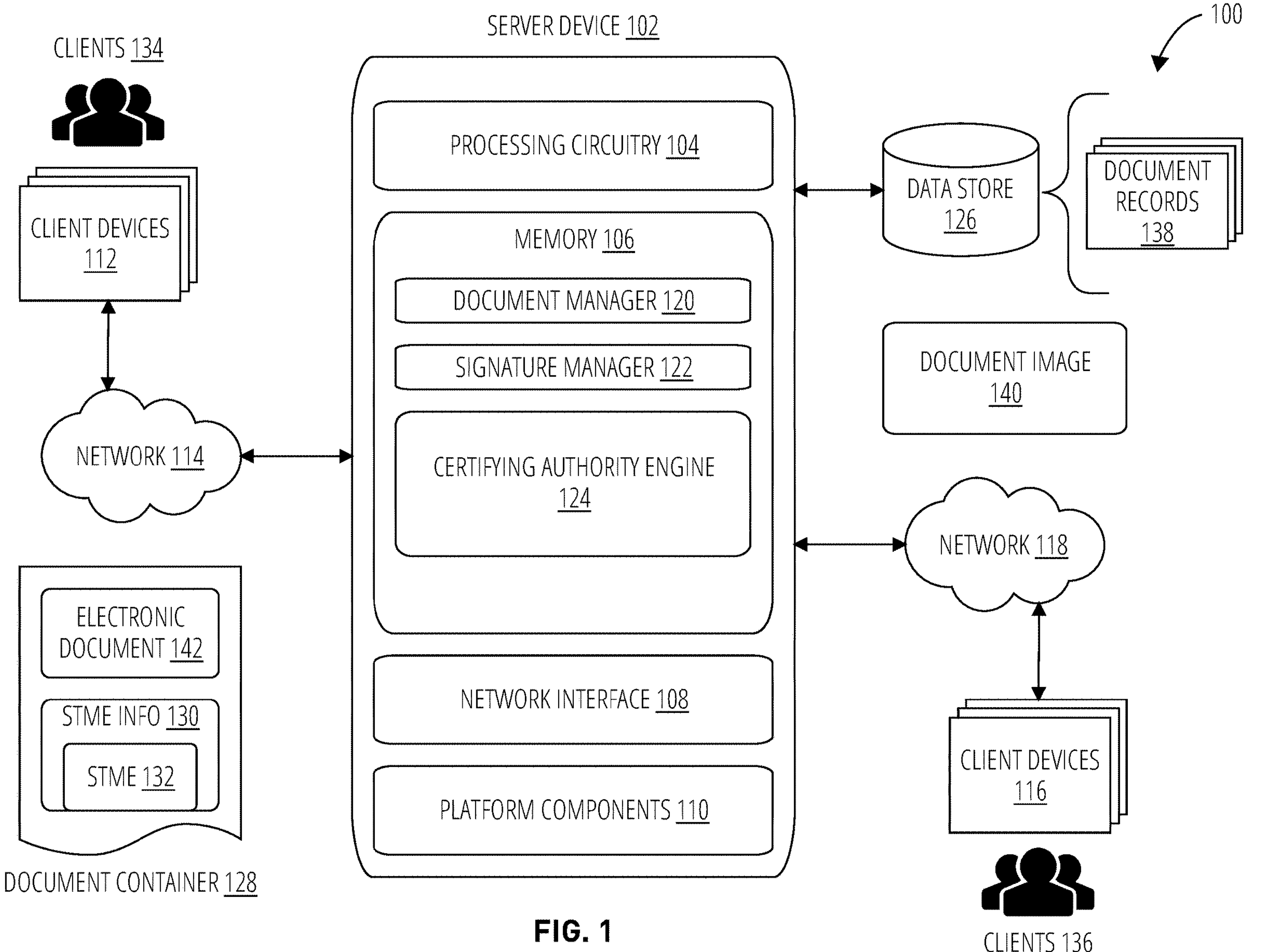
FIG. 1 illustrates an embodiment of a system that may provide an ability to generate, capture, and certify an interface, according to some implementations of the current subject matter.

Embodiments disclosed herein are generally directed to techniques for capturing and/or preserving various interfaces incorporating and/or embedding of electronic documents and/or portions thereof, where interfaces may be generated in accordance with various requirements. Such capturing of interfaces may be beneficial in generating of an audit trail that may memorialize specific actions executed in connection with the electronic document, which, in turn, may avert unauthorized modification of the electronic document, create an evidence record that may be used to illustrate that execution of various actions was authorized, thereby preventing occurrence of fraud.

In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally-binding agreement. Parties to an agreement can review, revise and sign the agreement from anywhere around the world on a multitude of electronic devices, such as computers, tablets and smartphones.

In some embodiments, the current subject matter may be configured to provide generation and capturing of interfaces associated with electronic documents and/or any other data. The generation and capturing of interfaces may be executed by one or more processors, servers, etc. and may be beneficial for the purposes of user experience (UX) certification in connection with the electronic document (and/or any other data) and any actions that may be taken (and/or prohibited) in connection with such documents. UX certification may also enable creation of an audit trail to capture interfaces (e.g., CSS, XML, HTML, JavaScript, etc.) that may be presented on a graphical user interface as part of a user experience. For example, a user experience may involve embedding of an agreement on a webpage along with a look-and-feel experience of the webpage. The created audit trail may be used to illustrate not only how data was captured but also to, for example, show that a particular action that was presented to a user was actually taken by the user, which may be helpful in preventing the user from asserting that the user was deceived into taking a different action.

By way of a non-limiting example, an electronic document may be received by a computing system, which may include one or more of such processors that may be associated with a certifying authority (e.g., a legal entity, a government entity, and/or any other type certification entity). Further, the electronic document may also be received by the certifying authority along with one or more presentation parameters associated with presentation of the electronic document on a graphical user interface. The presentation parameters may, for example, include at least one of the following: one or more functionalities associated with the electronic document, one or more document appearance parameters defining appearance of the electronic document on the graphical user interface, one or more interface appearance parameters defining appearance of the one or more electronic interfaces, and any combination thereof. Moreover, the functionalities may, for instance, include at least one of the following: a signing functionality associated with the electronic document (e.g., requesting signatures of parties to an agreement), a revision functionality associated with the electronic document (e.g., an ability to modify a clause in a contract), a review functionality associated with the electronic document, a negotiation functionality associated with the electronic document, and any combination thereof. Document appearance parameters may relate to how the electronic document may be presented on the interface. These may include at least one of the following: a page size of the electronic document, a size of text in the electronic document, a font of text in the electronic document, and any combination thereof. As can be understood, the above parameters are provided herein for example, illustrative purposes only, and the current subject matter is not limited to the specific parameters identified above.

Once the electronic document and its presentation parameters are received, the current subject matter may be configured to generate one or more electronic interfaces that may embed the electronic document. The interfaces may be configured to capture the electronic document in accordance with the one or more presentation parameters. For example, for presentation of an agreement for opening of a financial account, a webpage may be generated that may include a header identifying and/or describing the electronic document (i.e., "An agreement to open a financial account at a financial institution"), a block with one or more instructions on completion and/or signing of the agreement, and another block may include the actual agreement for opening the account. Each block may be positioned at a predetermined location on the web page and/or may have a certain size, color theme, etc. Moreover, the web page may also have a specific background, text that is displayed on the page may have a certain size and/or font. The web page may also be characterized by any other presentation parameters.

Each such presentation parameter may be appropriately specified to ensure that the web page embedding the agreement is generated, presented and captured in accordance with each parameter. This may enable certification of the presented web page by the certifying authority as being presented in accordance with the provided presentation parameters. Once the web page is certified, any unauthorized changes to it will be deemed as uncertified and, hence, unreliable and/or untrustworthy.

Generation of the interface (e.g., web page) may also be associated with generation of various metadata and/or any other data/information, which may also be captured by the certifying authority. The certifying authority may store the captured metadata and/or any other data/information in one or more storage locations along with the interface, the embedded electronic document and/or any other data. In some embodiments, certifying authority may also store one or more timestamps that may be indicative of a time of generation of the interface, a time of presentation of the interface on the graphical user interface, a time of capturing the interface, a time of storing the captured interface, etc. One or more of these timestamps may be used to illustrate that the interface was at a particular state (e.g., generated, presented, captured, stored, etc.) at a particular point in time. Timestamp(s) may also be stored together with the metadata and/or any other data, such as, for example, snapshots of the webpage embedding the electronic document.

The generated interface (e.g., web page) that includes the embedded electronic document along with other data and/or information (e.g., header block, instructions block, etc.) may be presented on the graphical user interface. As stated above, presentation of the interface may be associated with various metadata, timestamps, etc., one or more of which may be stored and may be used by the certifying authority to certify that the interface embedding the electronic document was in the particular state at a particular time. This may prevent unauthorized alterations of the interface and/or any of its contents (e.g., embedded document).

In some embodiments, the current subject matter may be configured to detect a request to modify the electronic document embedded in the interface presented on the graphical user interface. The request may, for example, be received via the interface. The request may seek to alter one or more clauses in the embedded electronic document, to electronically sign the document, and/or perform any other action and/or any combination of actions. The certifying authority may be configured to determine whether the received request is or is not authorized. If the request is authorized (e.g., received from an authorized entity), then modification of the electronic document may be permitted. Otherwise, the request may be blocked and any modification of the electronic document may be prevented. If modification is permitted and is carried out, the modified electronic document, as embedded in the interface, may be captured by the certifying authority and stored. The certifying authority may capture and store the modified electronic document along with interface as well as any metadata and/or any other data associated therewith together with the original captured interface (including the embedded document and/or any other data). The certifying authority may also store one or more timestamps that may be indicative of when the request to modify the electronic document was received, when the decision to allow modification was made, when modification of the electronic document was made, when capture of the modified electronic document and associated webpage was made, as well as any other timestamps. One or more of such timestamps may be stored together with metadata and/or any other data, such as, for example, snapshots of the webpage embedding the modified electronic document.

In some embodiments, the captured modified electronic document may be stored together with the stored captured original electronic document. Thus, each time an authorized modification of the electronic document is made, it may be captured and stored, while being appended to the prior modified version of the electronic document. Any captured interfaces containing each next modified electronic document may likewise be appended and stored to the captured interface(s) containing prior modified version(s) of the electronic document.

To determine whether or not a particular request to modify the electronic document is authorized or not, the certifying authority may query and/or retrieve one or more document authorization parameters that may be associated with the electronic document. The certifying authority may compare the retrieved parameters with the authorization parameters contained in the request. Such request authorization parameters may include, for example, but are not limited to, username and password, an authorized internet protocol (IP)

address, a biometric information, and/or any other authorization credentials. Upon matching the document authorization parameters and request authorization parameters, the certifying authority may permit modification of the electronic document and subsequently execute capturing of the modified electronic document. Otherwise, the certifying authority may prevent modification of the electronic document. In some embodiment, the certifying authority may also store various metadata, timestamps, and/or any other information associated with its decision to prohibit modification of the electronic document.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100 that may provide an ability to generate, capture, and certify an interface, according to some implementations of the current subject matter. In some embodiments, for example, the system 100 may include an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 14:
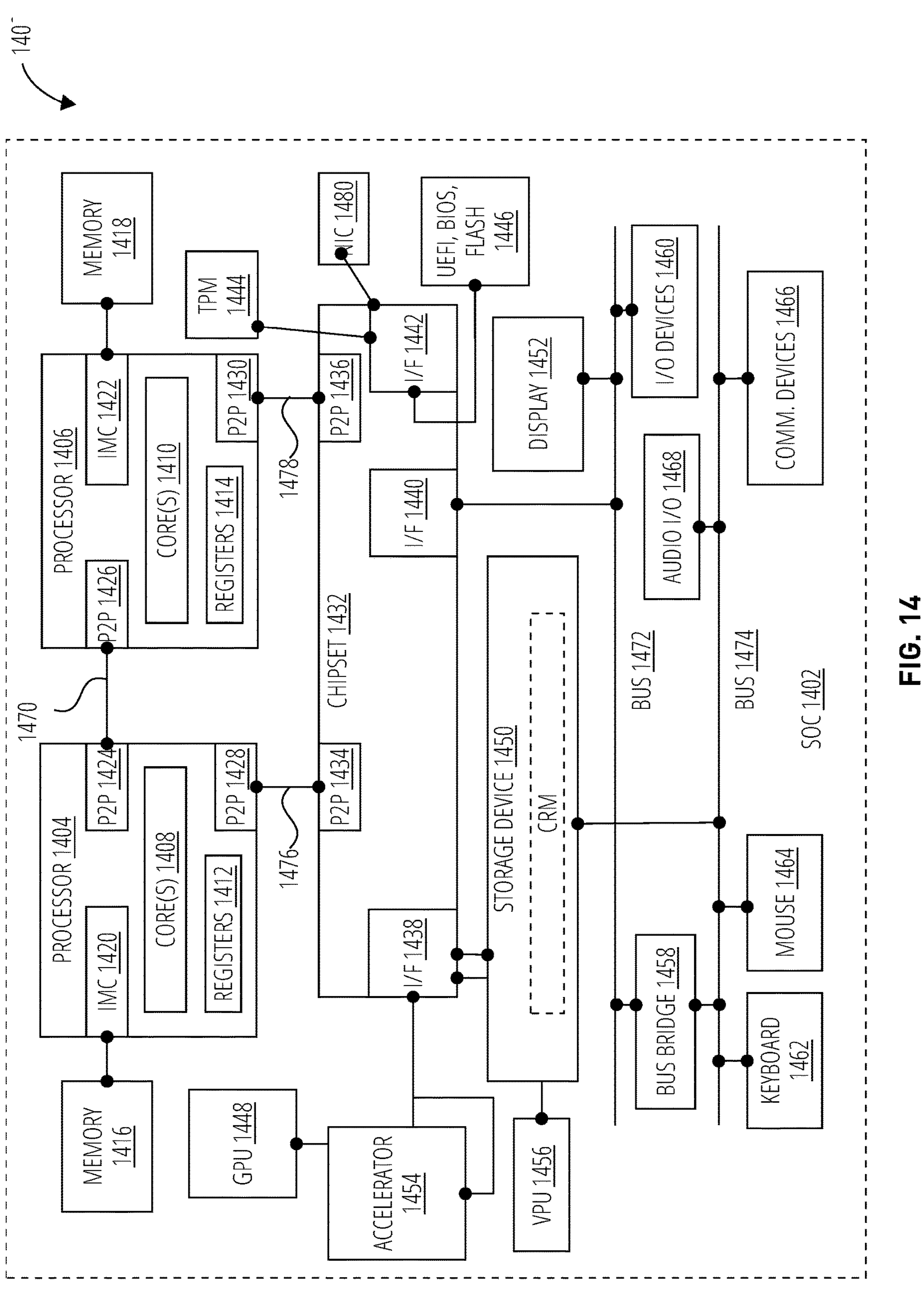
FIG. 14 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 1400 as depicted in FIG. 14.

Figure 15:
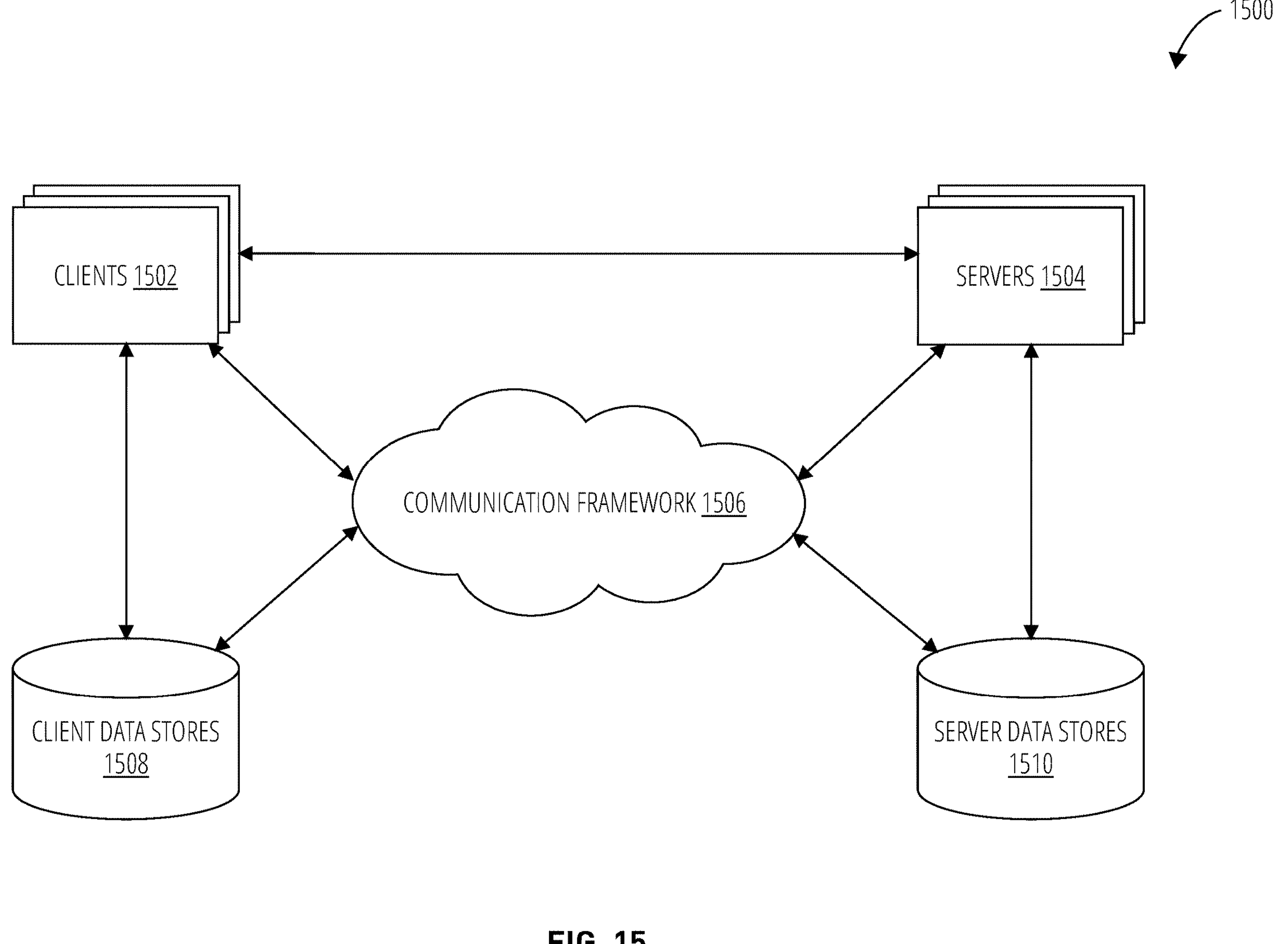
FIG. 15 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 1500 as depicted in FIG. 15.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a certifying authority engine 124, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more work flows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and work flows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140, and send the signed document image 140 to the server device 102 for verification, recordation, and storage.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 3:
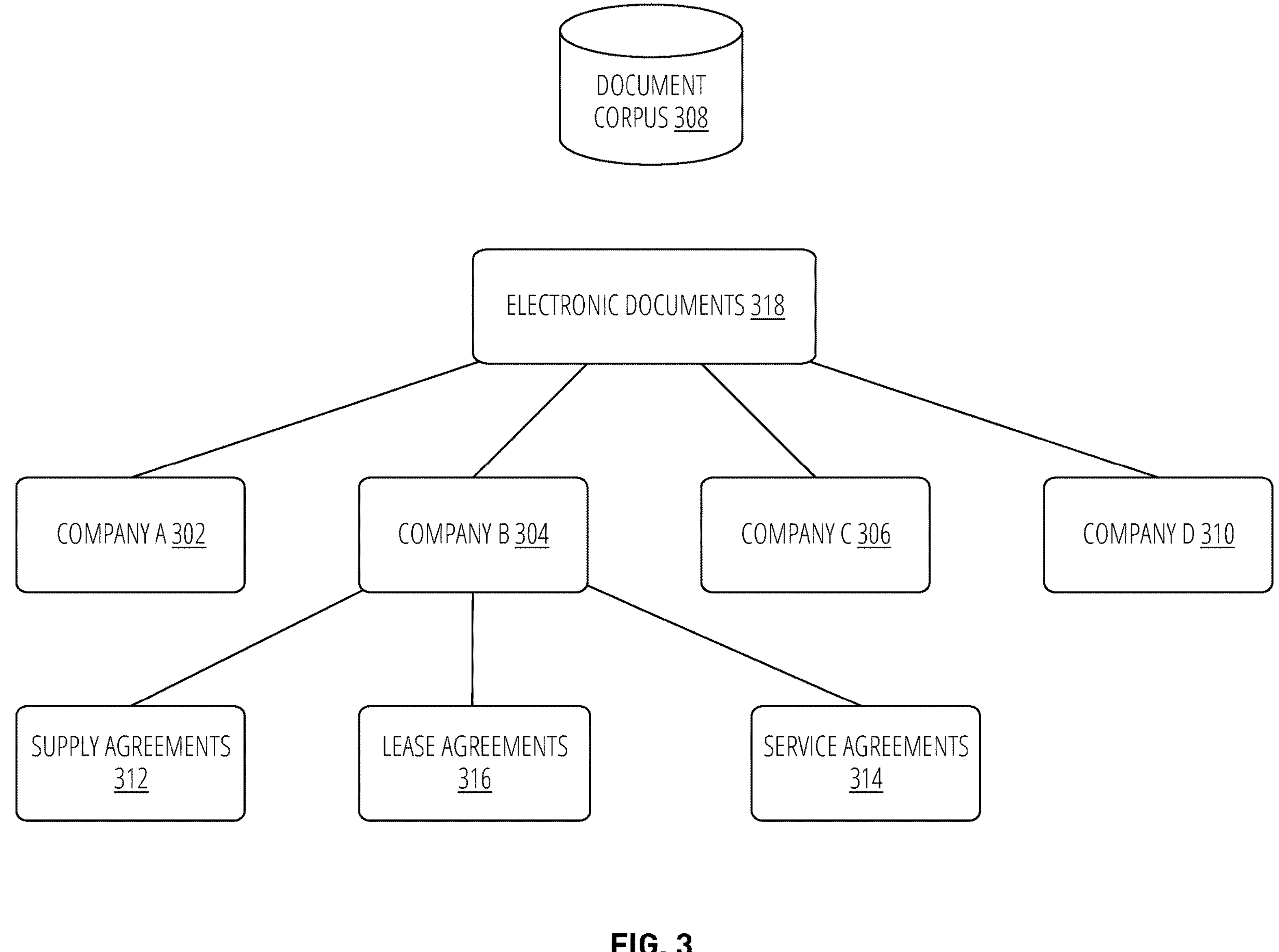
FIG. 3 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 318, as shown in FIG. 3, with tools, applications, and work flows developed by DocuSign. For example, the electronic documents 318 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more work flows developed by Adobe Systems Incorporated. The STME 132 input may be received from and generated by work flows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally-written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

The system 100 may also include a certifying authority engine 124. The certifying authority engine 124, as discussed in more detail below in connection with FIG. 2, may implement a set of tools and/or algorithms to generate an interface (e.g., a webpage, HTML, JavaScript, CSS, etc.) that may embed various data, including electronic documents, images, social medial posts, audio, video, and/or any other data, capture the interface and certify that the interface has been generated/captured in a particular state/form at a particular time. This may be helpful in memorializing that the interface was generated in a particular way and prevent entities from claiming that information contained in the interface has been presented to them in a different way than how it was captured/certified.

Figure 2:
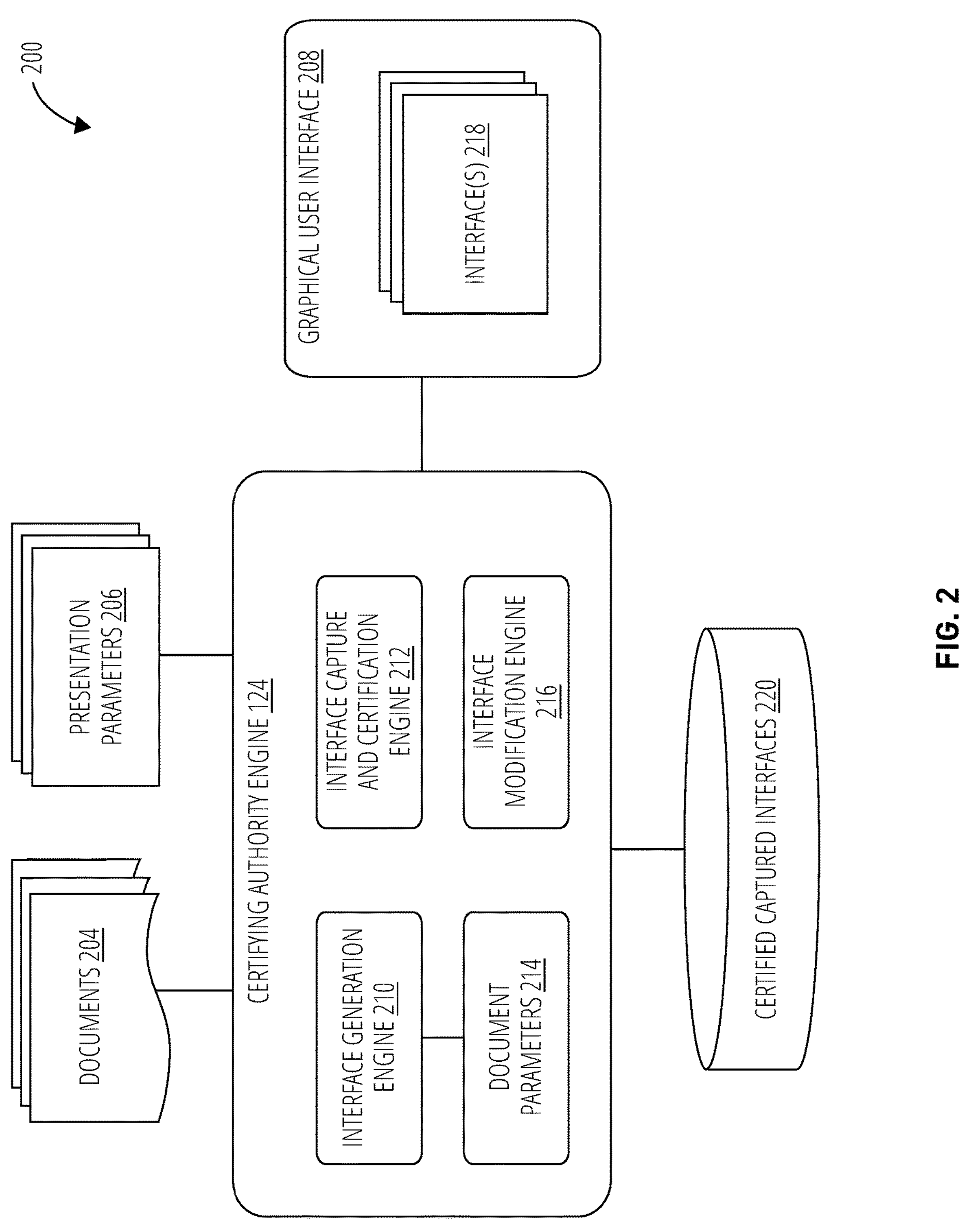
FIG. 2 illustrates an example interface certification system, according to some implementations of the current subject matter.

FIG. 2 illustrates an example interface certification system 200, according to some implementations of the current subject matter. The system 200 may include a certifying authority engine 124, one or more graphical user interface(s) 208, and a certified captured interfaces storage location 220. The certifying authority engine 124 may be configured to include an interface generation engine 210, an interface capture and certification engine 212, and an interface modification engine 216. The certifying authority engine 124 may be to receive one or more documents 204 and one or more presentation parameters 206 that may be used for generation of one or more interface(s) 218 (e.g., webpage, HTML, JavaScript, CSS, etc.) on the graphical user interface 208, where presentation parameters 206 specify how a particular electronic document 204 may need to be presented in one or more interface(s) 218 as well as how that such interface(s) 218 may need to appear (e.g., background color, font size, interface element blocks, etc.).

One or more components of the system 200 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some implementations, one or more components of the system 200 may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example implementations, one or more components of the system 200 may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, the system 200's one or more components may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system 200 also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system 200 may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system 200 and transmit and/or receive data.

One or more components of the system 200 may include and/or be in communication with one or more servers via one or more networks and may operate as a respective front-end to back-end pair with one or more servers. One or more components of the system 200 may transmit, for example from a mobile device application (e.g., executing on one or more user devices, components, etc.), one or more requests to one or more servers. The requests may be associated with retrieving data from servers (e.g., retrieving one or more documents 204, retrieving one or more presentation parameters 206, if not already provided). The servers may receive the requests from the components of the system 200. Based on the requests, servers may be configured to retrieve the requested data from one or more storage locations. Based on receipt of the requested data from the databases, the servers may be configured to transmit the received data to one or more components of the system 200, where the received data may be responsive to one or more requests.

The system 200 may include one or more networks, such as, for example, networks that may be communicatively coupling the certifying authority engine 124, the graphical user interface 208, the certified captured interfaces 220 and/or any other computing components. In some embodiments, networks may be one or more of a wireless network, a wired network or any combination of wireless network and wired network and may be configured to connect the components of the system 200 and/or the components of the system 200 to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1002.11b, 1002.15.1, 1002.11n and 1002.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 1002.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that maybe coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system 200.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

As shown in FIG. 2, one or more electronic documents 204 may be provided to the certifying authority engine 124 (which may be represented by one or more servers, one or more processors, memory, storage, and/or any other computing components) for the purposes of generating one or more interface(s) 218 that may capture the document(s) 204. The interface(s) 218 may be generated for capture in a particular desired way, which may be defined by one or more presentation parameters 206.

The electronic document(s) 204 may be transmitted to the certifying authority engine 124 along with a request to generate an interface for presentation on the graphical user interface 208, where the request may specify how the document and/or the interface may need to appear. The request may be any type of electronic communication, a query, and/or any other type of request. The request may also include the presentation parameters 206. The presentation parameters 206 may be appended to the document(s) 204 and/or may be transmitted separately and/or requested from a storage location (not shown in FIG. 2). Alternatively, or in addition, the document 204 and/or the presentation parameters 206 may be automatically obtained from one or more storage locations. For example, an electronic document 204 may be automatically transmitted (with or without the presentation parameters 206) to the certifying authority engine 124 upon its creation. This way any alterations to the electronic document 204 may be captured.

In some example, non-limiting embodiments, the presentation parameters 206 may define one or more functionalities associated with the electronic document 204, one or more document appearance parameters defining appearance of the electronic document 204 in the interface(s) 218 presented on the graphical user interface 208, one or more interface(s) 218 appearance parameters defining appearance of the one or more electronic interface(s) 218, and any combination thereof. Non-limiting examples of functionalities associated with the electronic document 204 may include a signing functionality associated with the electronic document 204, a revision functionality associated with the electronic document 204, a review functionality associated with the electronic document 204, a negotiation functionality associated with the electronic document 204, and any combination thereof. Appearance of the electronic document 204 and/or the interface(s) 218 may be defined by one or more appearance parameters that may include a page size of the electronic document, a size of text in the electronic document, a font of text in the electronic document, and/or any other parameters, and/or any combination thereof.

The received electronic document 204 and the presentation parameters 206 may be provided to the interface generation engine 210. The interface generation engine 210 may be configured to generate one or more interface(s) 218 for presentation on the graphical user interface 208 using one or more document parameters 214, which may be selected from the presentation parameters 206. Alternatively, or in addition, the document parameters 214 may be separately received by the certifying authority engine 124 (such as, for example, upon an appropriate query to a storage location storing document parameters 214).

The interface generation engine 210 may generate the interface(s) 218 by arranging various elements on the interface(s) 218 and embedding the document 204 in accordance with the presentation parameters 206. For example, for opening of a financial account, the interface generation engine 210 may be configured to generate a webpage (i.e., interface(s) 218) that may include a header block, which may include a title of the webpage: "Financial Account Opening at Financial Institution ABC". The webpage may also include an instructions block that may provide instructions with respect to the document that may be embedded in the webpage (e.g., "Please review the Financial Account Opening Agreement, and sign at the bottom"). Following these blocks (and/or any others), the interface generation engine 210 may embed the document 204 that may be provided to it. The document 204 may be arranged and/or formatted in accordance with the document parameters 214, which may define a specific text font, text size, text color, layout, background color of the document, and/or any other parameters.

Each element of the interface(s) 218 may be generated and arranged in accordance with the presentation parameters 206. For instance, the header block may be formatted in accordance with a specific text font, text size, text color, layout, background color, and/or any other parameters. The instructions block (and/or any other blocks) may likewise be generated and arranged in a similar fashion. Further, various other elements of the interface(s) 218 (e.g., background color, logos, etc.) may be defined by the presentation parameters 206 and formatted and arranged accordingly. The above arrangements allow for the interface(s) 218 to be generated in accordance with specific requirements, as defined by the presentation parameters 206, to prevent tampering with the interface(s) 218 and/or any of its contents, including the document 204.

As part of interface generation, the interface generation engine 210 may be configured to generate and/or store various metadata and/or timestamps. Metadata may be indicative of the actions that the interface generation engine 210 may have taken, data it may have collected and/or used for generation of the interface(s) 218. It may also be indicative of various authentication data (e.g., username, password, biometric identification, etc.) associated with creation of interface(s) 218. Timestamps may be representative of each action that may have been executed by the interface generation engine 210 in connection with generation of the interface 218, e.g., receiving of the document 204, receiving of the presentation parameters 206, applying the presentation parameters 206 to generate an interface(s) 218, embedding the document 204 into the interface(s) 218, and/or any other actions.

As can be understood, more than one interface 218 may be generated by the interface generation engine 210. To generate each interface 218, the interface generation engine 210 may select and/or use specific presentation parameters 206 and/or the electronic documents and/or portions of the electronic document 204. Moreover, separate metadata may be assigned to each interface 218 and/or separate timestamps may be associated with each action taken by the interface generation engine 210 in connection with generation of each interface 218. Alternatively, or in addition, the interface generation engine 210 may generate each interface 218 separately from other interfaces 218 and/or all or some interfaces 218 may be generated as a group of interfaces 218.

Once the interface(s) 218 is generated, the interface capture and certification engine 212 may capture the interface to memorialize that it as it was created at a particular point in time in a particular state/form. For example, capturing may involve taking a snapshot (e.g., still snapshot, dynamic snapshot, a recording, etc.) of the interface(s) 218 in its current state/form. The interface capture and certification engine 212 may also assign a timestamp to the captured interface(s) 218. Various metadata may also be associated with the captured/certified interface 218 (e.g., identifiers identifying the electronic document 204, document embedding parameters, etc.).

The captured/certified interface(s) 218 along with its metadata and assigned timestamps may be certified by the interface capture and certification engine 212 as being created in a particular state/form (as defined by the presentation parameters 206 and/or metadata) and at a particular time (as indicated by assigned timestamps and/or metadata collected at the time of creation of interface and/or its capture/certification). Capture and/or certification of an interface (e.g., a webpage, an HTML, CSS, JavaScript, etc.) may be executed using any existing methods.

The captured/certified interface 218 may be stored in the certified captured interfaces storage location 220. It may also be presented on the graphical user interface 208. Once the captured/certified interface 218 is presented on the graphical user interface 208 and/or stored in the storage location 220, any user viewing it and/or computing device receiving it would be prevented from attempting to claim, subsequent to presentation of the interface, that it contained different information from what the information and/or data that has been captured/certified by the certifying authority engine 124.

In some embodiments, the certifying authority engine 124 may be configured to receive a request to modify the captured/certified interface 218. As will be discussed below in connection with FIGS. 7-8, the request may be processed by the interface modification engine 216 of the certifying authority engine 124. The request to modify may be in connection with the embedded electronic document 204. Referring to the example above, the request may seek to revise a clause in the financial account opening agreement (e.g., conditions for closing the account, etc.). The interface modification engine 216 may analyze the request and make a determination whether an entity is authorized to modify the document 204. If the entity is authorized (e.g., after submission of a valid and/or authorized username and password), the interface modification engine 216 may be configured to allow modification of the document 204. In some embodiments, each time a change is made, a new interface 218 may be generated by the interface generation engine 210 and then captured/certified by the interface capture and certification engine 212. The newly generated/captured/certified interface 218 may be stored in the storage location 220 and presented on the graphical user interface 208. The new interface 218 may be appended to the originally generated/captured/certified interface 218. This way all interfaces 218 that may be associated with a particular document 204 may be stored and/or retrieved together for analysis and/or audit trail purposes.

In some embodiments, electronic documents 204 may be provided to the certifying authority engine 124 (e.g., from a computing device used by a user (not shown in FIG. 2)). Alternatively, or in addition, the documents 204 may be queried and/or retrieved from a storage location (not shown in FIG. 2), where such documents may be organized and/or stored in a particular way. For example, the storage location may store a document corpus or document corpuses that may include various electronic documents, data, metadata, and/or any other information and that may be organized/grouped in any desired way (e.g., financial account agreements, lease agreements, etc.). As can be understood, the current subject matter is not limited to electronic documents and generation of interfaces and their capture/certification may be used for any other type of data. For example, the current subject matter may be used to generate/capture/certify a social media posting as posted/appearing on a social media website. Various metadata (e.g., IP address, user information, etc.), timestamps, content of the social media posting may be captured. This may be helpful in showing that a particular posting contained specific information at the time of posting, thereby preventing a claim that some other information was contained in the social media posting.

FIG. 3 illustrates an example of a document corpus 308 suitable for use by the certifying authority engine 124. The document corpus 308 may be stored in one or more database and/or storage locations and may be accessible (e.g., via a query) by the interface capture and certification engine 212. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as agreements, contracts, web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 3, the document corpus 308 may include information from electronic documents 318 derived from the electronic documents 204 provided to the certifying authority engine 124 and/or stored in a data store. The electronic documents 318 may include any electronic document having metadata such as STME suitable for receiving an electronic signature, including both signed electronic documents or unsigned electronic documents. Different sets of the electronic documents 318 of the document corpus 308 may be associated with different entities. For example, a first set of electronic documents 318 is associated with a company A 302. A second set of electronic documents 318 is associated with a company B 304. A third set of electronic documents 318 is associated with a company C 306. A fourth set of electronic documents 318 is associated with a company D 310. Although some embodiments discuss the document corpus 308 having electronic documents 318, it may be appreciated that the document corpus 308 may have unsigned electronic document as well. Embodiments are not limited in this context.

Each set of electronic documents 318 associated with a defined entity may include one or more subsets of the electronic documents 318 categorized by document type. For instance, the second set of electronic documents 318 associated with company B 304 may have a first subset of electronic documents 318 with a document type for supply agreements 312, a second subset of electronic documents 318 with a document type for lease agreements 316, and a third subset of electronic documents 318 with a document type for service agreements 314. In some embodiments, the sets and subsets of electronic documents 318 may be identified using labels manually assigned by a human operator, such as metadata added to a document record for a signed electronic document created in a document management system, or feedback from a user of the system 200 during a document generation process. In some embodiments, the sets and subsets of electronic documents 318 may be unlabeled.

Figure 4:
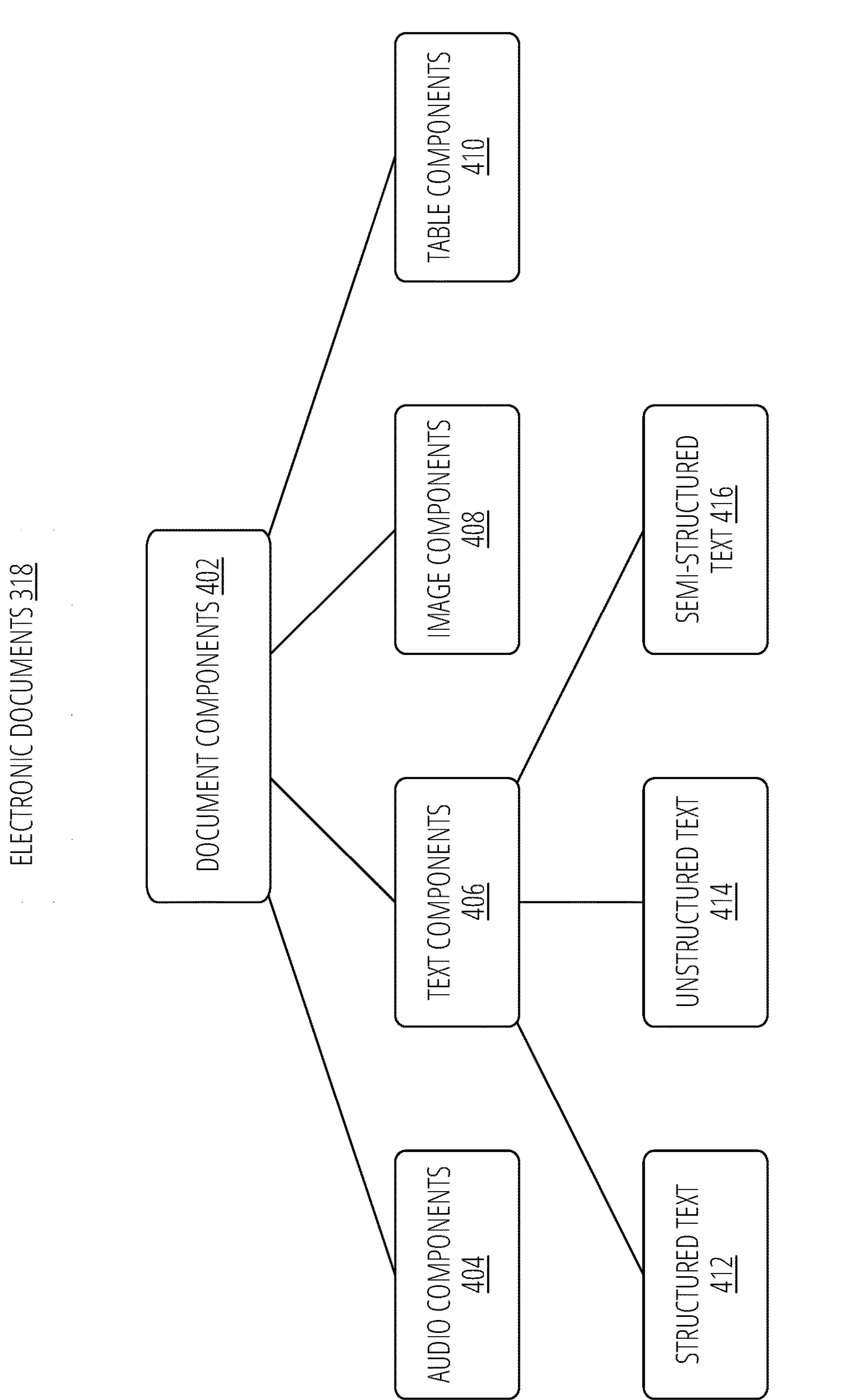
FIG. 4 illustrates electronic documents in accordance with one embodiment.

FIG. 4 illustrates an example of an electronic document 318. An electronic document 318 may include different information types that collectively form a set of document components 402 for the electronic document 318. The document components 402 may include, for example, one or more audio components 404, text components 406, image components 408, or table components 410. Each document component 402 may comprise different content types. For example, the text components 406 may comprise structured text 412, unstructured text 414, or semi-structured text 416.

Structured text 412 refers to text information that is organized in a specific format or schema, such as words, sentences, paragraphs, sections, clauses, and so forth. Structured text 412 has a well-defined set of rules that dictate how the data should be organized and represented, including the data types and relationships between data elements.

Unstructured text 414 refers to text information that does not have a predefined or organized format or schema. Unlike structured text 412, which is organized in a specific way, unstructured text 414 can take various forms, such as text information stored in a table, spreadsheet, figures, equations, header, footer, filename, metadata, and so forth.

Semi-structured text 416 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 5:
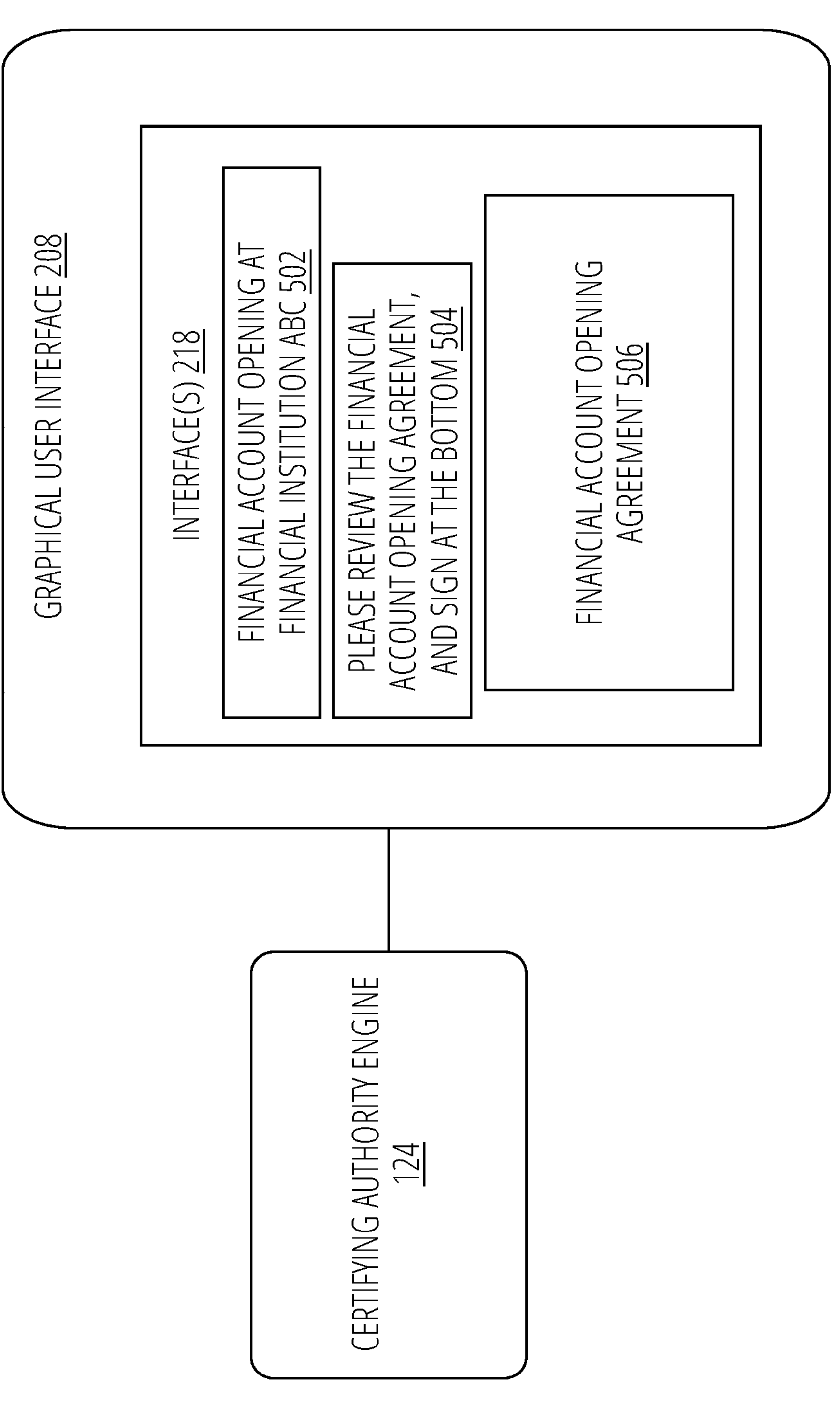
FIG. 5 illustrates an example of the graphical user interface that may include one or more interface(s).

FIG. 5 illustrates an example of the graphical user interface 208 that may include one or more interface(s) 218. As discussed herein, the graphical user interface 208 may be used to display the interface(s) 218 that have been generated, captured and certified by the certifying authority engine 124. This may be helpful in preventing unauthorized alteration of any documents that may be embedded in the interface(s) 218 and/or claiming that different information was presented than what was captured/certified by certifying authority engine 124 and/or be useful in creating an audit trail to track all actions occurring in connection with the document embedded in the interface(s) 218.

In some example, non-limiting embodiments, the interface(s) 218 may include a header block 502, an instructions block 504, and an embedded document 506. As can be understood, the interface(s) 218 may include any other blocks and/or fewer blocks and/or be arranged in any desired way. The interface(s) 218 may be arranged in accordance with one or more presentation parameters 206 that may specify layout of the interface(s) 218, size of any text, font of any texts, color of any text, color of any background, sizes of any blocks (e.g., header block 502, instructions block 504, etc.) and/or windows that may be appearing on the interface (s) 218, as well as any other parameters, information, data, etc.

The embedded document block 506 may be configured to include the document 204 that may be embedded into the interface(s) 218. Embedding of the document 204 into the interface(s) 218 may be performed by the certifying authority engine 124 in accordance with one or more presentation parameters 206, which may likewise specify size of any text, font of any texts, color of any text, color of any background, etc. Moreover, the presentation parameters 206 may specify whether there are any functions that may be associated with the embedded document 506 (e.g., a review function, a signature function, a negotiation function, etc.).

By way of a non-limiting example, the interface 218 may be generated as a webpage for the purposes of opening of a financial agreement at a financial institution. As shown in FIG. 5, the header block 502 of the webpage may include "Financial Account Opening at Financial Institution ABC" as the header of the interface(s) 218. The webpage may also provide instructions in the instructions block 504 with respect to the document embedded in the webpage: "Please review the Financial Account Opening Agreement, and sign at the bottom". Lastly, the "Financial Account Opening Agreement" may be embedded in the block 506 of the webpage. As can be understood, the interface(s) 218 may include any other type of interface embedding any desired information/data (e.g., a social media post, an image, a graphic, a video, etc.).

Figure 6:
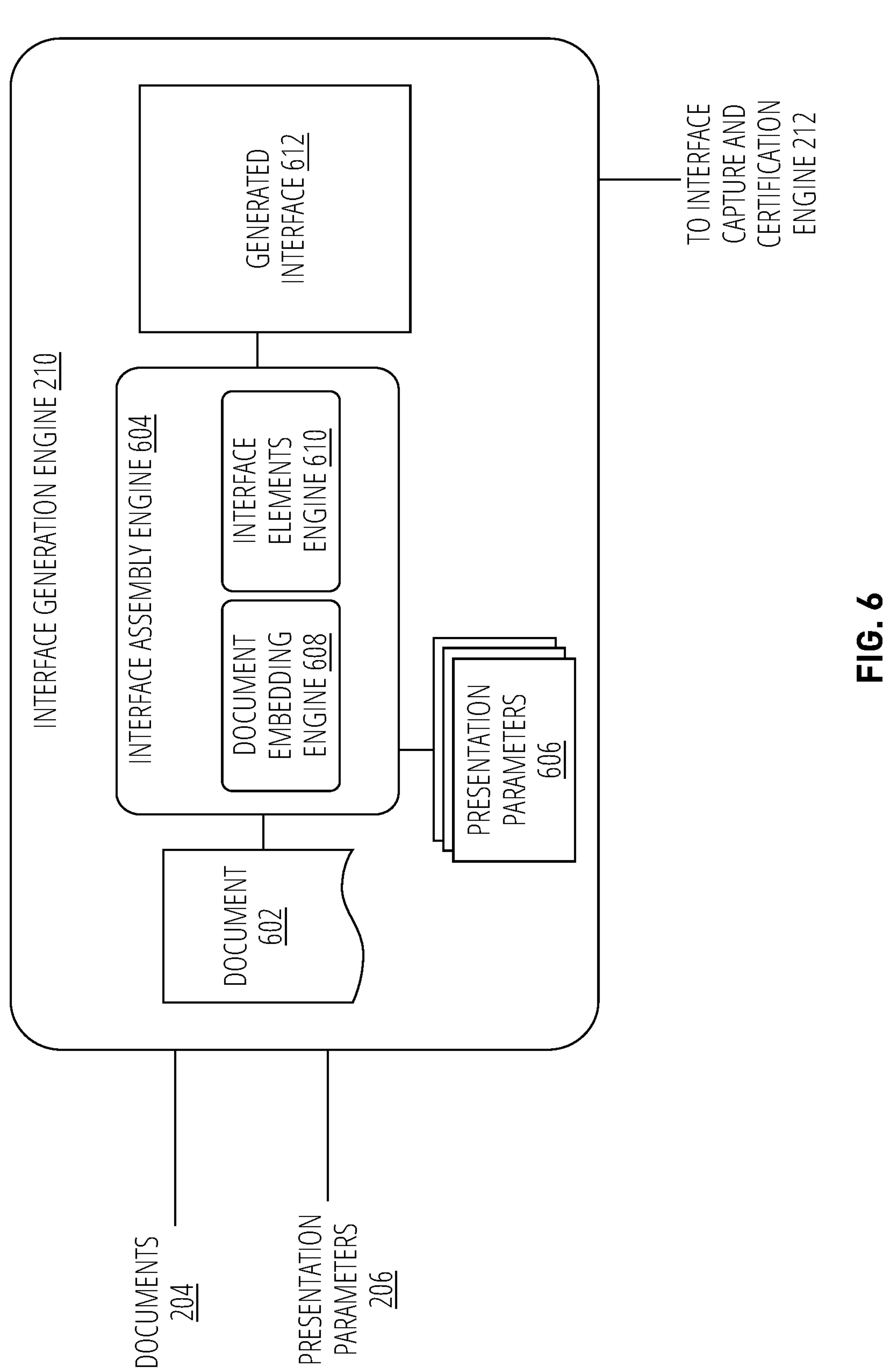
FIG. 6 illustrates an example interface generation engine, according to some embodiments of the current subject matter.

FIG. 6 illustrates an example interface generation engine 210, according to some embodiments of the current subject matter. The interface generation engine 210 may include an interface assembly engine 604 that may, in turn, include document embedding engine 608 and interface elements engine 610. The interface generation engine 210 may receive one or more documents 204 as well as one or more presentation parameters 206 for generation of one or more generated interfaces 612 to be presented on the graphical user interface 208.

To generate the interface 612, the interface generation engine 210 may be configured to receive one or more documents 104 and one or more presentation parameters 206. As stated above, the presentation parameters 206 may specify how a particular document 104 may need to be presented on the graphical user interface 208. The interface generation engine 210 may select a document 602 from the received documents 104 and provide it to the interface assembly engine 604. The document 602 may be selected for embedding into the interface 612 (e.g., a webpage) that is to be displayed on the graphical user interface 208. Upon receiving the document 602, the interface assembly engine 604 may be configured to query, retrieve, access and/or select from the presentation parameters 106, one or more presentation parameters 606 that will be used by the interface assembly engine 604 to generate the interface 612. As discussed herein, the presentation parameters 606 may be any parameters that may specify how the interface displaying the document 602 may need to appear, including how the embedded document 602 may need to be embedded and presented on the interface 612.

In some embodiments, the interface assembly engine 604 may be configured to generate a blank interface (e.g., as represented by an HTML code, etc.) that may be modified in accordance with one or more presentation parameters 606 to create a particular appearance as well as arrange one or more blocks (e.g., blocks 502, 504, etc. as shown in FIG. 5). In particular, the document embedding engine 608 of the interface assembly engine 604 may be configured to generate a block (e.g., an HTML code for the block) that may be used to embed the document 602. The underlying code of the block may be integrated with the code (e.g., HTML, JavaScript, CSS, etc.) of the blank interface. The document embedding engine 608, using presentation parameters 606, may specify where the document 602 is to be embedded and how it should appear on the interface (e.g., using specific text font, text size, text color, size of the page, etc.).

The interface elements engine 610 may use the presentation parameters 606 to generate various other elements of the interface (e.g., blocks 502, 504, etc.) as well as create a particular appearance of the interface (e.g., white background, black text, etc.). The interface elements engine 610 may also arrange the elements on the interface in a particular order. The engine 610 may generate an appropriate code (e.g., HTML, JavaScript, CSS, etc.) that may be integrated with the code of the blank interface as well as the code associated with embedding of the document provided by the document embedding engine 608.

Once execution of actions associated with the document embedding and interface elements are completed, the interface assembly engine 604 may be configured to output the generated interface 612. The interface 612 may eventually be presented on the graphical user interface 208. The interface 612 may also be stored in one or more storage locations (not shown in FIG. 6), such as, for example, storage location 220 (as shown in FIG. 1).

The document embedding engine 608 and the interface elements engine 610 may also be configured to generate various metadata associated with each action that may be executed by one or both engines. The metadata may be appended to the generated interface 612. The metadata may include various identifiers, tags, etc., which may relate to document 602, presentation parameters 606, and/or any other data/information. Additionally, one or more timestamps may be stored together with the interface 612 to indicate when a particular action associated with generation of interface 612 was initiated, taken, and/or completed.

Figure 7:
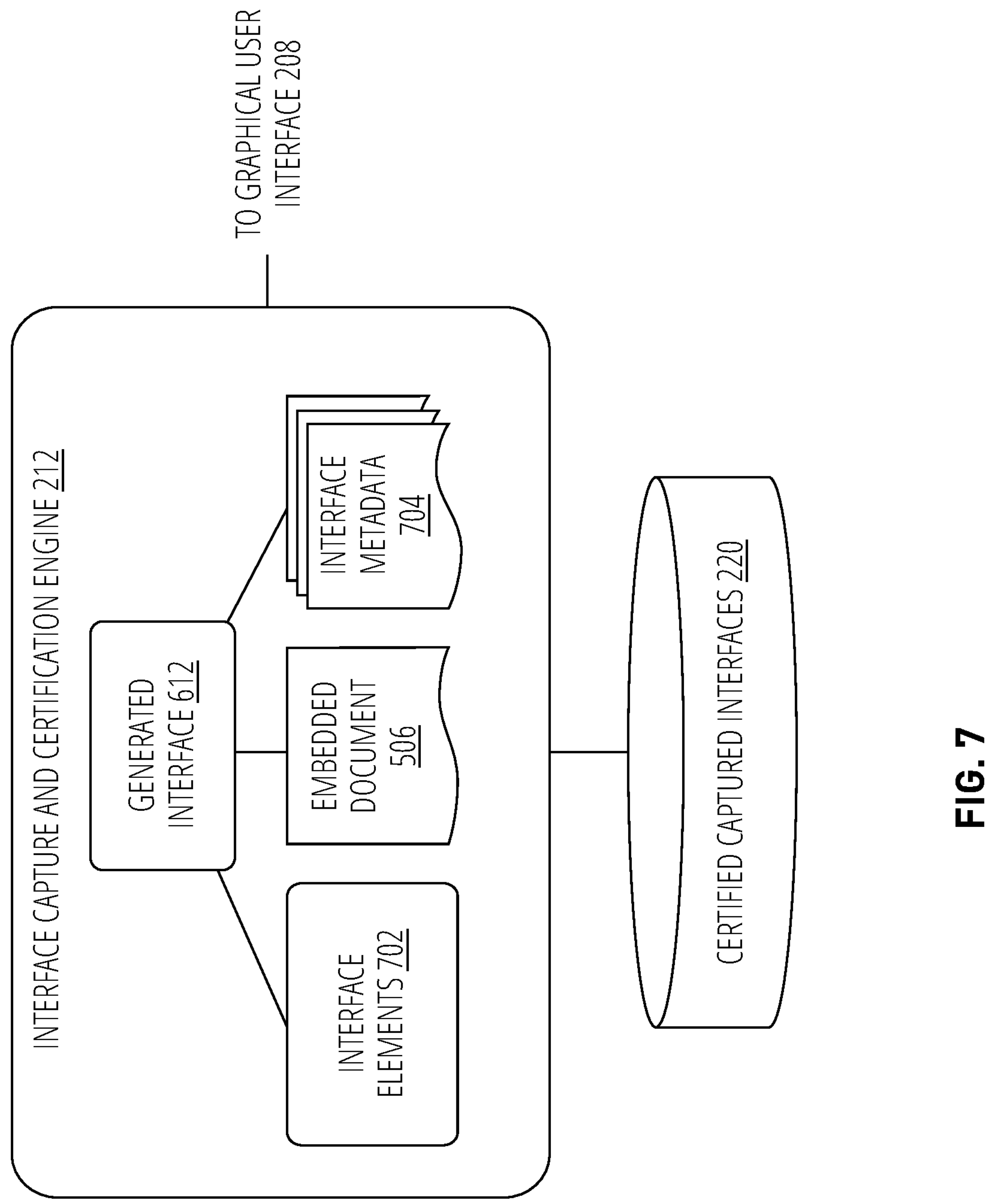
FIG. 7 illustrates an example interface capture and certification engine, according to some implementations of the current subject matter.

The generated interface 612 may then be processed by the interface capture and certification engine 212, as shown in FIG. 7. The engine 212 may be configured to capture (e.g., take a snapshot, a video, etc.) the interface 612, including its interface elements 702, the embedded document 506, and interface metadata 704 that has been generated by the engine 210. The capture of the interface 612 may be associated with a particular timestamp that may be indicative of when a final interface 612, prior to being presented on the graphical user interface 208 was created. Alternatively, or in addition, interface may be captured at any time during creation of the interface and appropriate timestamp assigned to memorialize the time of capture.

Once the interface has been captured, the interface capture and certification engine 212 may be configured to certify the captured interface 612 (e.g., official entity certification, governmental entity certification, legal entity certification, and/or any other type of certification). A result of the certification of the interface 612 may include an indication that the interface 612 was created at a particular time and was created in accordance with specific presentation parameters 206 to have a specific state/form, as defined by the presentation parameters 206, as well as embedded specific document 506 in a particular state/form, as again defined by the presentation parameters 206.

The captured/certified interface 612 may be stored in one or more storage locations, such as for example, certified captured interfaces storage location 220. The interface may be stored together with all interface elements 702, embedded document 506, interface metadata 704 as well as any timestamps. Such storing may be useful in creating an audit trail that may be used to show that an interface was created and presented in the graphical user interface 208 in a particular way.

Further, the captured/certified interface 612 may be presented on the graphical user interface 208. The capture/certified interface 612 may be presented as it was created by the interface generation engine 210 and captured/certified by the interface capture and certification engine 212.

In some embodiments, once the capture/certified interface 612 is presented on the graphical user interface 208, it may be desirable to modify the document 506 that may be embedded into the interface 612. Modifications may include review of the document 506, revision of one or more portions (e.g., clauses) of the document 506, signing of the document 506, and/or any other type of modifications.

Figure 8:
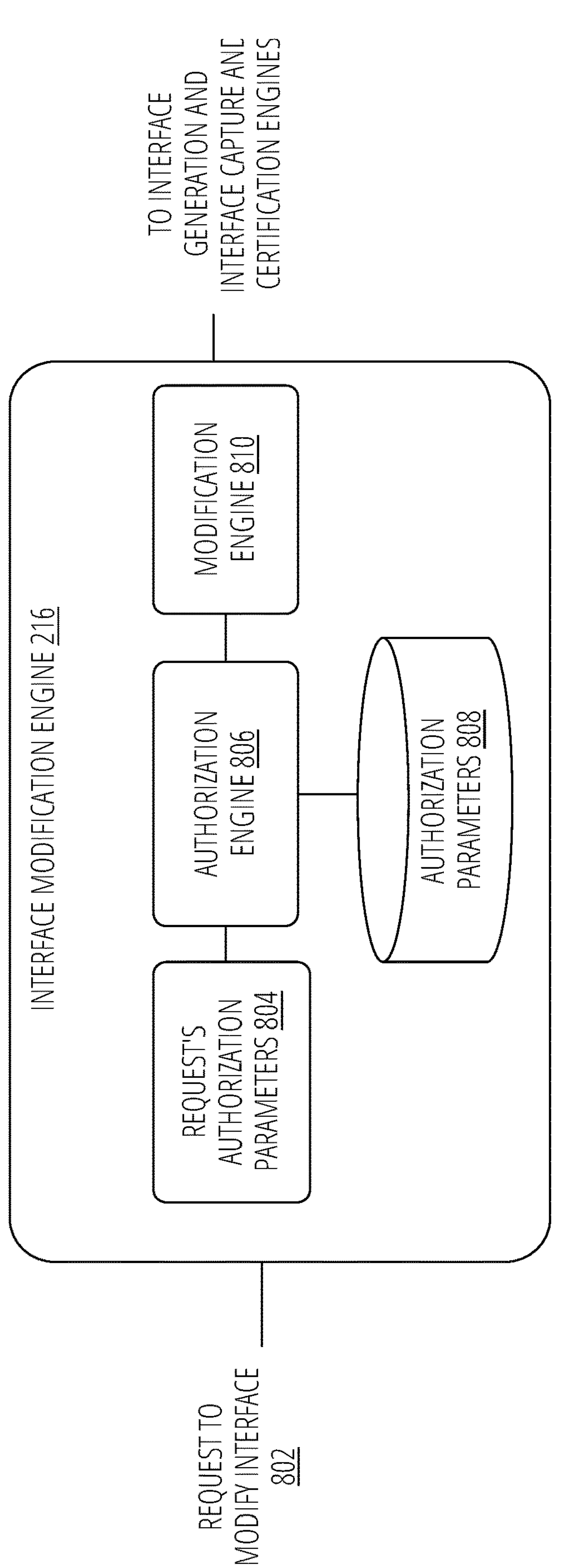
FIG. 8 illustrates an aspect of the subject matter in accordance with one embodiment.

As shown in FIG. 8, to initiate modification process, a request 802 to modify the document 506 may be received (via, for example, graphical user interface 208) by the interface modification engine 216. The request may include one or more request's authorization parameters 804. Parameters 804 may include identification information related to the request (e.g., username, password, biometric information, etc.), an indication of authority to make the modification to the document 506 (e.g., an identifier indicating that a party to the agreement to open a financial account (as in the example above) is authorized to make modifications).

The request's authorization parameters 804, along with the request 802, may be provided to an authorization engine 806 of the interface modification engine 216. The authorization engine 806 may analyze the request 802 and initiate a query to storage location 808 that may store authorization parameters that may have been created and stored for the purposes modifying the document 506. The authorization parameters may be created automatically upon creation of the interface 612 and/or generated manually, and may include a username, password, biometric information, etc.

The authorization engine 806 may then compare the received parameters 804 and the stored parameters retrieved from storage location 808. If a match between the parameters is determined, the request 802 may be passed to the modification engine 810 so that modifications to the document 506 may be executed.

Once modifications to the document 506 are made, the interface generation engine 210 and interface capture and certification engine 212 may be configured to receive the modified document 506. Using the processes described above, the engines 210 and 212 may generate a new interface for capturing/certification and presentation on the graphical user interface 208. The newly generated interface containing the modified document may be associated with its own metadata and/or timestamps that may indicate the modifications that were made, time when modifications were made, and/or any other information.

Figure 9:
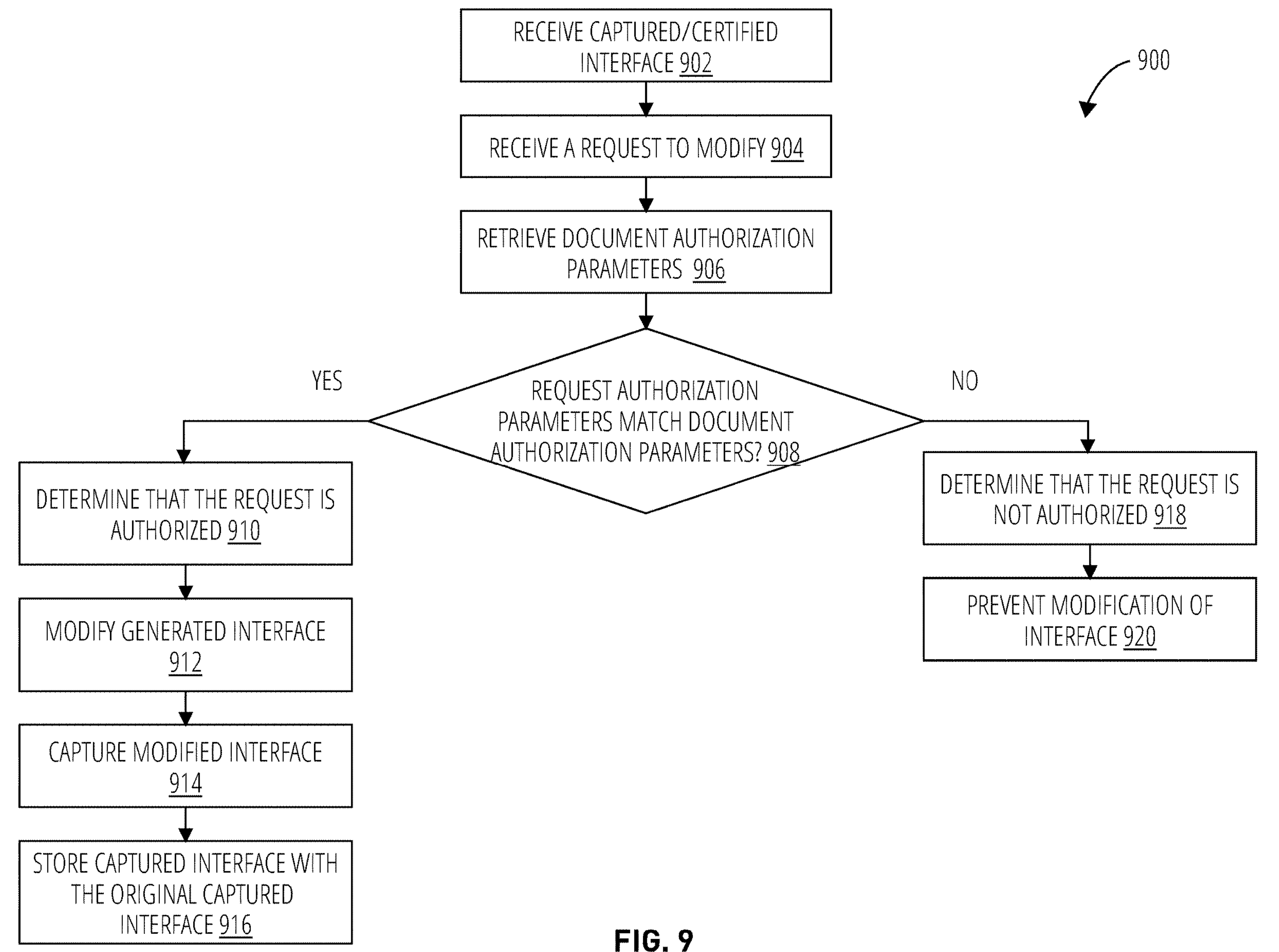
FIG. 9 illustrates an example process for executing modifications to an embedded document, according to some implementations of the current subject matter.

FIG. 9 illustrates an example process 900 for executing modifications to an embedded document, according to some implementations of the current subject matter. The process 900 may be executed by the certifying authority engine 124, including its interface modification engine 216 as well as engines 210 and 212.

At 902, a captured interface, e.g., interface 612 may be received and may be displayed on the graphical user interface 208. At 904, the certifying authority engine 124 may be configured to receive a request (e.g., request 802) to modify interface. The request may be received via the graphical user interface 208. For example, the request may be transmitted by a user attempting to sign an agreement related to opening a financial account at a financial institution (as in the example above). The request may include various request's authorization parameters 804 (e.g., username, password, biometric information, etc.) that may be entered by the user. The parameters 804 may be entered by the user in response to a prompt generated on the graphical user interface 208. The request 802 along with the request's authorization parameters 804 may be provided to the authorization engine 806.

At 906, the authorization engine 806 may retrieve stored authorization parameters 808 from a storage location. The stored parameters may have been generated at the time the interface 612 was generated and stored in the storage location.

At 908, the authorization engine 806 may compare the request's authorization parameters 804 and the stored authorization parameters 808 to determine whether or not to permit modification of the document 602 by the modification engine 810. If there is no match, the authorization engine 806 may be configured to determine that the request to modify the document 602 is not authorized (e.g., the user transmitting the request has no authority to make changes to the document 602), at 718, and prevent modification of the interface and the document, at 720.

Otherwise, if a match between request's authorization parameters 804 and the authorization parameters 808 is determined, the authorization engine 806 may determine that the request is authorized, at 710. The request 802 may then be provided to the modification engine 810, at 712, so that modifications of the document may be made. Once the modifications are made, the interface generation engine 210 and the interface capture and certification engine 212 may be configured generate and capture/certify the interface containing the modified document 602, at 714, and store it together with the original interface 612 at the storage location 220.

FIG. 10 illustrates an example process 1000 for generating and capturing/certifying an interface, according to some implementations of the current subject matter. The process 1000 may be executed by the system 100 shown in FIG. 1, and in particular, the certifying authority engine 124 as shown in FIG. 2.

The process 1000 may, for example, be used to generate an interface 612, as shown in FIG. 6, where the interface may embed one or more electronic documents 104. The interface 612 may be generated using one or more presentation parameters 206 that may define appearance of the interface 612 including any of its blocks, elements, etc., appearance of the embedded document (e.g., text font, text size, etc.), and/or any other elements of the interface 612. As can be understood, the electronic documents 104 may include any type of documents, data, information, etc., such as, for example, but is not limited to, agreements, websites, images, graphics, video, audio, social media postings, etc.

At 1002, the certifying authority engine 124 may receive an electronic document (e.g., document 104) and one or more presentation parameters (e.g., presentation parameters 206) associated with presentation of the electronic document on a graphical user interface (e.g., graphical user interface 208). As stated above, the parameters may define how the interface, including any of its elements, embedded document, appearance, etc., may be presented on the graphical user interface 208. In some embodiments, the presentation parameters 206 may also define various metadata that may be captured.

At 1004, the certifying authority engine 124 may generate one or more electronic interfaces 108 embedding the electronic document 104. The electronic interfaces may capture the electronic document in accordance with one or more presentation parameters. The interface may be generated using interface generation engine 210 of the certifying authority engine 124 and captured/certified using interface capture and certification engine 212 of the engine 124.

At 1006, the certifying authority engine 124 may be configured to present the electronic interface(s) 108 with the electronic document 104 embedded therein on the graphical user interface 208.

In some embodiments, at 1008, the certifying authority engine 124 may detect a request (e.g., request 802) that may be received via the electronic interface, to modify the electronic document. In particular, the request may be processed by the interface modification engine 216, as shown in FIG. 8. At 1010, the interface modification engine 216, and in particular, its authorization engine 806, may determine whether the request is an authorized request. If so, interface modification engine 216 may modify the electronic document and the interface capture and certification engine 212 may capture the modified electronic document. However, if at 1012, the authorization engine 806 determines that the request 802 us an unauthorized request, the certifying authority engine 124 may prevents modification of the electronic document.

FIG. 11 illustrates an example process 1100 for generating and capturing/certifying an interface, according to some implementations of the current subject matter. The process 1100, similar to process 1000 shown in FIG. 10, may be executed by the system 100 shown in FIG. 1, and in particular, the certifying authority engine 124 as shown in FIG. 2.

At 1102, the certifying authority engine 124 may receive an electronic document and one or more presentation parameters associated with presentation of the electronic document on a graphical user interface.

At 1104, the certifying authority engine 124 may generate one or more electronic interfaces embedding the electronic document. The electronic interfaces may capture the electronic document in accordance with one or more presentation parameters.

At 1106, the certifying authority engine 124 may present the electronic interfaces on the graphical user interface with the electronic document embedded in the electronic interfaces.

At 1108, the certifying authority engine 124 may store the captured electronic document in one or more storage locations.

FIG. 12 illustrates yet another example process 1200 for generating and capturing/certifying an interface, according to some implementations of the current subject matter. The process 1200 may likewise be performed by the system 100's certifying authority engine 124 as shown in FIG. 2.

At 1202, the certifying authority engine 124 may receive an electronic document and one or more presentation parameters associated with presentation of the electronic document on a graphical user interface.

At 1204, the certifying authority engine 124 may generate one or more electronic interfaces embedding the electronic document. The generated electronic interfaces embedding the electronic document may be captured by the certifying authority engine 124 in accordance with one or more presentation parameters, at 1206. The captured interfaces may be stored in one or more storage locations.

At 1208, the certifying authority engine 124 may modify, via the electronic interfaces, the electronic document. The modified electronic document may be captured. The captured modified electronic document may be associated with the original stored captured electronic document, at 1210, and stored together with the original captured electronic document, at 1212.

Figure 13:
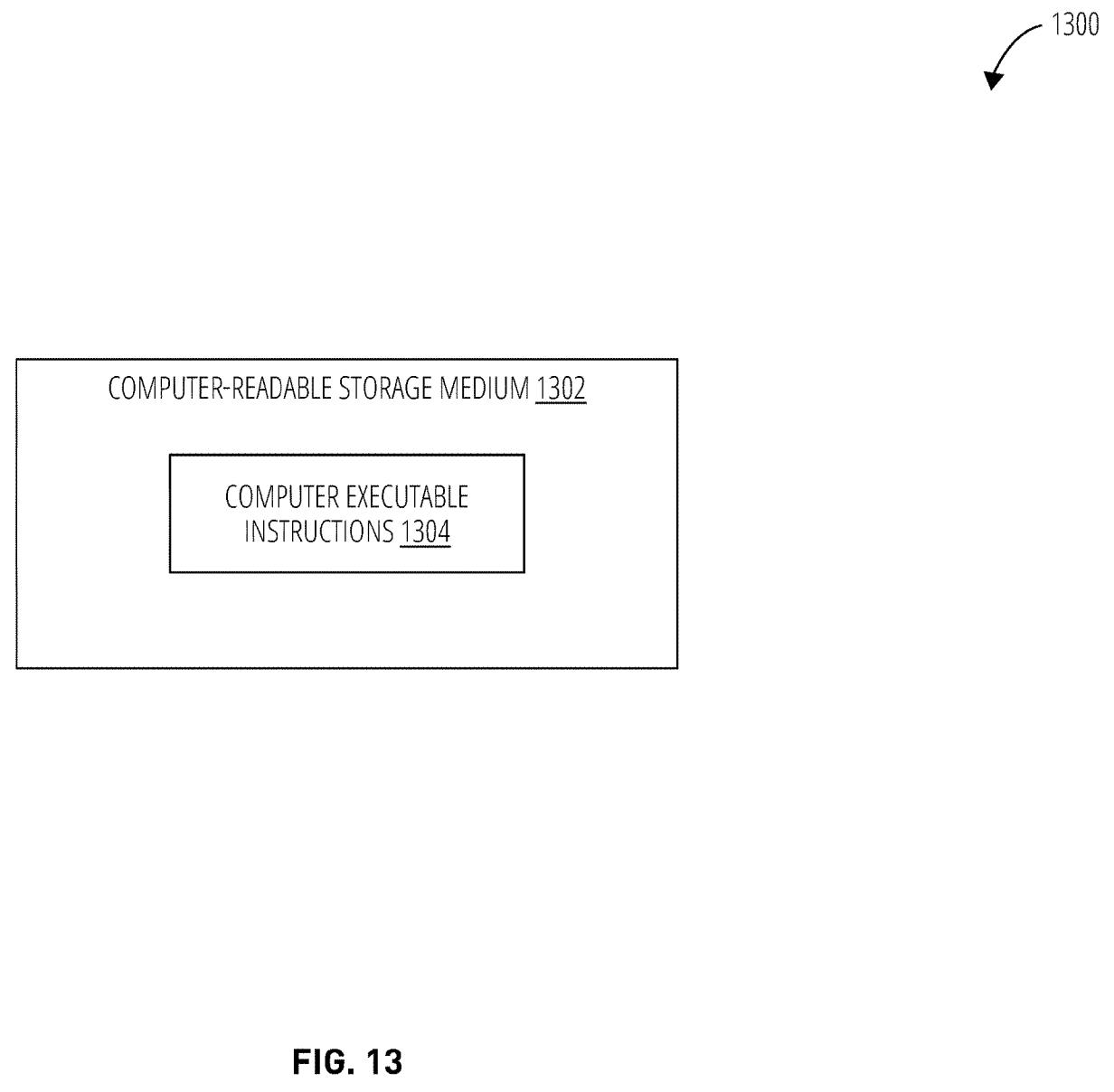

FIG. 13 illustrates an apparatus 1300. Apparatus 1300 may comprise any non-transitory computer-readable storage medium 1302 or machine-readable storage medium, such as an optical, magnetic or semiconductor storage medium. In various embodiments, apparatus 1300 may comprise an article of manufacture or a product. In some embodiments, the computer-readable storage medium 1302 may store computer executable instructions with which circuitry can execute. For example, computer executable instructions 1304 can include instructions to implement operations described with respect to any logic flows described herein. Examples of computer-readable storage medium 1302 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1304 may include any suitable type of code, such as source code, compiled code, interpreted code, executable code, static code, dynamic code, object-oriented code, visual code, and the like.

FIG. 14 illustrates an embodiment of a computing architecture 1400. Computing architecture 1400 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1400 may have a single processor with one core or more than one processor. Note that the term "processor" refers to a processor with a single core or a processor package with multiple processor cores. In at least one embodiment, the computing architecture 1400 is representative of the components of the system 100. More generally, the computing architecture 1400 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 14, computing architecture 1400 comprises a system-on-chip (SoC) 1402 for mounting platform components. System-on-chip (SoC) 1402 is a point-to-point (P2P) interconnect platform that includes a first processor 1404 and a second processor 1406 coupled via a point-to-point interconnect 1470 such as an Ultra Path Interconnect (UPI). In other embodiments, the computing architecture 1400 may be of another bus architecture, such as a multi-drop bus. Furthermore, each of processor 1404 and processor 1406 may be processor packages with multiple processor cores including core(s) 1408 and core(s) 1410, respectively. While the computing architecture 1400 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 1404 and chipset 1432. Some platforms may include additional components and some platforms may only include sockets to mount the processors and/or the chipset. Furthermore, some platforms may not have sockets (e.g., SoC, or the like). Although depicted as a SoC 1402, one or more of the components of the SoC 1402 may also be included in a single die package, a multi-chip module (MCM), a multi-die package, a chiplet, a bridge, and/or an interposer. Therefore, embodiments are not limited to a SoC.

The processor 1404 and processor 1406 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1404 and/or processor 1406. Additionally, the processor 1404 need not be identical to processor 1406.

Processor 1404 includes an integrated memory controller (IMC) 1420 and point-to-point (P2P) interface 1424 and P2P interface 1428. Similarly, the processor 1406 includes an IMC 1422 as well as P2P interface 1426 and P2P interface 1430. IMC 1420 and IMC 1422 couple the processor 1404 and processor 1406, respectively, to respective memories (e.g., memory 1416 and memory 1418). Memory 1416 and memory 1418 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 1416 and the memory 1418 locally attach to the respective processors (i.e., processor 1404 and processor 1406). In other embodiments, the main memory may couple with the processors via a bus and shared memory hub. Processor 1404 includes registers 1412 and processor 1406 includes registers 1414.

Computing architecture 1400 includes chipset 1432 coupled to processor 1404 and processor 1406. Furthermore, chipset 1432 can be coupled to storage device 1450, for example, via an interface (I/F) 1438. The I/F 1438 may be, for example, a Peripheral Component Interconnect-enhanced (PCIe) interface, a Compute Express Link® (CXL) interface, or a Universal Chiplet Interconnect Express (UCIe) interface. Storage device 1450 can store instructions executable by circuitry of computing architecture 1400 (e.g., processor 1404, processor 1406, GPU 1448, accelerator 1454, vision processing unit 1456, or the like). For example, storage device 1450 can store instructions for server device 102, client devices 112, client devices 116, or the like.

Processor 1404 couples to the chipset 1432 via P2P interface 1428 and P2P 1434 while processor 1406 couples to the chipset 1432 via P2P interface 1430 and P2P 1436. Direct media interface (DMI) 1476 and DMI 1478 may couple the P2P interface 1428 and the P2P 1434 and the P2P interface 1430 and P2P 1436, respectively. DMI 1476 and DMI 1478 may be a high-speed interconnect that facilitates, e.g., eight Giga Transfers per second (GT/s) such as DMI 3.0. In other embodiments, the processor 1404 and processor 1406 may interconnect via a bus.

The chipset 1432 may comprise a controller hub such as a platform controller hub (PCH). The chipset 1432 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1432 may comprise more than one controller hub such as a chipset with a memory controller hub, a graphics controller hub, and an input/output (I/O) controller hub.

In the depicted example, chipset 1432 couples with a trusted platform module (TPM) 1444 and UEFI, BIOS, FLASH circuitry 1446 via I/F 1442. The TPM 1444 is a dedicated microcontroller designed to secure hardware by integrating cryptographic keys into devices. The UEFI, BIOS, FLASH circuitry 1446 may provide pre-boot code. The I/F 1442 may also be coupled to a network interface circuit (NIC) 1480 for connections off-chip.

Furthermore, chipset 1432 includes the I/F 1438 to couple chipset 1432 with a high-performance graphics engine, such as, graphics processing circuitry or a graphics processing unit (GPU) 1448. In other embodiments, the computing architecture 1400 may include a flexible display interface (FDI) (not shown) between the processor 1404 and/or the processor 1406 and the chipset 1432. The FDI interconnects a graphics processor core in one or more of processor 1404 and/or processor 1406 with the chipset 1432.

The computing architecture 1400 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 1454 and/or vision processing unit 1456 can be coupled to chipset 1432 via I/F 1438. The accelerator 1454 is representative of any type of accelerator device (e.g., a data streaming accelerator, cryptographic accelerator, cryptographic co-processor, an offload engine, etc.). One example of an accelerator 1454 is the Intel® Data Streaming Accelerator (DSA). The accelerator 1454 may be a device including circuitry to accelerate copy operations, data encryption, hash value computation, data comparison operations (including comparison of data in memory 1416 and/or memory 1418), and/or data compression. For example, the accelerator 1454 may be a USB device, PCI device, PCIe device, CXL device, UCIe device, and/or an SPI device. The accelerator 1454 can also include circuitry arranged to execute machine learning (ML) related operations (e.g., training, inference, etc.) for ML models. Generally, the accelerator 1454 may be specially designed to perform computationally intensive operations, such as hash value computations, comparison operations, cryptographic operations, and/or compression operations, in a manner that is more efficient than when performed by the processor 1404 or processor 1406. Because the load of the computing architecture 1400 may include hash value computations, comparison operations, cryptographic operations, and/or compression operations, the accelerator 1454 can greatly increase performance of the computing architecture 1400 for these operations.

The accelerator 1454 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 1454. For example, the accelerator 1454 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1454 via a non-posted write (e.g., a deferred memory write (DMWr)). One example of an instruction that atomically submits a work descriptor to the shared work queue of the accelerator 1454 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1454. The dedicated work queue may accept job submissions via commands such as the movdir64b instruction.

Various I/O devices 1460 and display 1452 couple to the bus 1472, along with a bus bridge 1458 which couples the bus 1472 to a second bus 1474 and an I/F 1440 that connects the bus 1472 with the chipset 1432. In one embodiment, the second bus 1474 may be a low pin count (LPC) bus. Various devices may couple to the second bus 1474 including, for example, a keyboard 1462, a mouse 1464 and communication devices 1466.

Furthermore, an audio I/O 1468 may couple to second bus 1474. Many of the I/O devices 1460 and communication devices 1466 may reside on the system-on-chip (SoC) 1402 while the keyboard 1462 and the mouse 1464 may be add-on peripherals. In other embodiments, some or all the I/O devices 1460 and communication devices 1466 are add-on peripherals and do not reside on the system-on-chip (SoC) 1402.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 includes one or more clients 1502 and servers 1504. The clients 1502 may implement a client version of the server device 102, for example. The servers 1504 may implement a server version of the server device 102, for example. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 may communicate information between each other using a communication framework 1506. The communications communication framework 1506 may implement any well-known communications techniques and protocols. The communications communication framework 1506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

(117) The communication framework 1506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1502 and the servers 1504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-20 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a computer implemented method may include receiving, using at least one processor, an electronic document and one or more presentation parameters associated with presentation of the electronic document on a graphical user interface, generating, using the at least one processor, one or more electronic interfaces embedding the electronic document, wherein the one or more electronic interfaces capture the electronic document in accordance with the one or more presentation parameters, presenting, using the at least one processor, the one or more electronic interfaces on the graphical user interface with the electronic document embedded in the one or more electronic interfaces, detecting, using the at least one processor, a request, received via the one or more electronic interfaces, to modify the electronic document, upon determining, using the at least one processor, the request to be an authorized request, modifying the electronic document and capturing the modified electronic document, and upon determining, using the at least one processor, the request to be an unauthorized request, preventing modifying of the electronic document.

The method may also include storing the captured electronic document in one or more storage locations communicatively coupled to the at least one processor.

The method may also include associating the captured modified electronic document with the stored captured electronic document, and storing the captured modified electronic document with the stored captured electronic document.

The method may also include wherein the one or more presentation parameters include at least one of the following: one or more functionalities associated with the electronic document, one or more document appearance parameters defining appearance of the electronic document on the graphical user interface, one or more interface appearance parameters defining appearance of the one or more electronic interfaces, and any combination thereof.

The method may also include wherein the one or more functionalities include at least one of the following: a signing functionality associated with the electronic document, a revision functionality associated with the electronic document, a review functionality associated with the electronic document, a negotiation functionality associated with the electronic document, and any combination thereof.

The method may also include wherein the one or more the one or more document appearance parameters include at least one of the following: a page size of the electronic document, a size of text in the electronic document, a font of text in the electronic document, and any combination thereof.

The method may also include retrieving, in response to the detecting, one or more document authorization parameters associated with the electronic document, comparing the one or more document authorization parameters with one or more request authorization parameters, upon matching the one or more document authorization parameters and the one or more request authorization parameters, modifying the electronic document and capturing the modified electronic document, and upon failing the one or more document authorization parameters and the one or more request authorization parameters, preventing modifying of the electronic document.

In one aspect, a system, comprising: at least one processor; and at least one non-transitory storage media storing instructions, that when executed by the at least one processor, cause the at least one processor to receive an electronic document and one or more presentation parameters associated with presentation of the electronic document on a graphical user interface; generate one or more electronic interfaces embedding the electronic document, wherein the one or more electronic interfaces capture the electronic document in accordance with the one or more presentation parameters; present the one or more electronic interfaces on the graphical user interface with the electronic document embedded in the one or more electronic interfaces; detect a request, received via the one or more electronic interfaces, to modify the electronic document; upon determining the request to be an authorized request, modify the electronic document and capturing the modified electronic document; and upon determining the request to be an unauthorized request, prevent modifying of the electronic document.

The system may also include wherein the at least one processor is further configured to store the captured electronic document in one or more storage locations communicatively coupled to the at least one processor.

The system may also include wherein the at least one processor is further configured to associate the captured modified electronic document with the stored captured electronic document; and store the captured modified electronic document with the stored captured electronic document.

The system may also include wherein the one or more presentation parameters include at least one of the following: one or more functionalities associated with the electronic document, one or more document appearance parameters defining appearance of the electronic document on the graphical user interface, one or more interface appearance parameters defining appearance of the one or more electronic interfaces, and any combination thereof.

The system may also include wherein the one or more functionalities include at least one of the following: a signing functionality associated with the electronic document, a revision functionality associated with the electronic document, a review functionality associated with the electronic document, a negotiation functionality associated with the electronic document, and any combination thereof.

The system may also include wherein the one or more the one or more document appearance parameters include at least one of the following: a page size of the electronic document, a size of text in the electronic document, a font of text in the electronic document, and any combination thereof.

The system may also include wherein the at least one processor is further configured to retrieve, in response to the detecting, one or more document authorization parameters associated with the electronic document; compare the one or more document authorization parameters with one or more request authorization parameters; upon matching the one or more document authorization parameters and the one or more request authorization parameters, modify the electronic document and capturing the modified electronic document; and upon failing the one or more document authorization parameters and the one or more request authorization parameters, prevent modifying of the electronic document.

In one aspect, a computer program product comprising a non-transitory machine-readable medium storing instructions that, when executed by at least one programmable processor, cause the at least one programmable processor to: receive an electronic document and one or more presentation parameters associated with presentation of the electronic document on a graphical user interface; generate one or more electronic interfaces embedding the electronic document, wherein the one or more electronic interfaces capture the electronic document in accordance with the one or more presentation parameters; present the one or more electronic interfaces on the graphical user interface with the electronic document embedded in the one or more electronic interfaces; detect a request, received via the one or more electronic interfaces, to modify the electronic document; upon determining the request to be an authorized request, modify the electronic document and capturing the modified electronic document; and upon determining the request to be an unauthorized request, prevent modifying of the electronic document.

The computer program product may also include wherein the at least one processor is further configured to store the captured electronic document in one or more storage locations communicatively coupled to the at least one processor.

The computer program product may also include wherein the at least one processor is further configured to associate the captured modified electronic document with the stored captured electronic document; and store the captured modified electronic document with the stored captured electronic document.

The computer program product may also include wherein the one or more presentation parameters include at least one of the following: one or more functionalities associated with the electronic document, one or more document appearance parameters defining appearance of the electronic document on the graphical user interface, one or more interface appearance parameters defining appearance of the one or more electronic interfaces, and any combination thereof; and the one or more functionalities include at least one of the following: a signing functionality associated with the electronic document, a revision functionality associated with the electronic document, a review functionality associated with the electronic document, a negotiation functionality associated with the electronic document, and any combination thereof.

The computer program product may also include wherein the one or more the one or more document appearance parameters include at least one of the following: a page size of the electronic document, a size of text in the electronic document, a font of text in the electronic document, and any combination thereof.

The computer program product may also include wherein the at least one processor is further configured to retrieve, in response to the detecting, one or more document authorization parameters associated with the electronic document; compare the one or more document authorization parameters with one or more request authorization parameters; upon matching the one or more document authorization parameters and the one or more request authorization parameters, modify the electronic document and capturing the modified electronic document; and upon failing the one or more document authorization parameters and the one or more request authorization parameters, prevent modifying of the electronic document.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:

receiving, using at least one processor, an electronic document and one or more presentation parameters associated with presentation of the electronic document on a graphical user interface, wherein the one or more presentation parameters include at least one of the following: one or more functionalities associated with the electronic document, one or more document appearance parameters defining appearance of the electronic document on the graphical user interface, one or more interface appearance parameters defining appearance of the one or more electronic interfaces, or any combination thereof, generating, using the at least one processor, one or more electronic interfaces embedding the electronic document, wherein the one or more electronic interfaces capture the electronic document in accordance with the one or more presentation parameters;

presenting, using the at least one processor, the one or more electronic interfaces on the graphical user interface with the electronic document embedded in the one or more electronic interfaces;

detecting, using the at least one processor, a request, received via the one or more electronic interfaces, to modify the electronic document;

determining, using the at least one processor, whether the request is authorized or not authorized; and performing, using the at least one processor, modifications to the electronic document in accordance with the determination.

2. The method of claim 1, wherein upon determining the request to be an authorized request, modifying the electronic document and capturing the modified electronic document; and upon determining the request to be an unauthorized request, preventing modifying of the electronic document.

3. The method of claim 2, further comprising storing the captured electronic document in one or more storage locations communicatively coupled to the at least one processor.

4. The method of claim 3, further comprising associating the captured modified electronic document with the stored captured electronic document; and storing the captured modified electronic document with the stored captured electronic document.

5. The method of claim 1, wherein the one or more functionalities include at least one of the following: a signing functionality associated with the electronic document, a revision functionality associated with the electronic document, a review functionality associated with the electronic document, a negotiation functionality associated with the electronic document, and any combination thereof.

6. The method of claim 1, wherein the one or more document appearance parameters include at least one of the following: a page size of the electronic document, a size of text in the electronic document, a font of text in the electronic document, and any combination thereof.

7. The method of claim 2, further comprising retrieving, in response to the detecting, one or more document authorization parameters associated with the electronic document;

comparing the one or more document authorization parameters with one or more request authorization parameters;

upon matching the one or more document authorization parameters and the one or more request authorization parameters, modifying the electronic document and capturing the modified electronic document; and upon failing the one or more document authorization parameters and the one or more request authorization parameters, preventing modifying of the electronic document.

8. A system, comprising:

at least one processor; and at least one non-transitory storage media storing instructions, that when executed by the at least one processor, cause the at least one processor to receive an electronic document and one or more presentation parameters associated with presentation of the electronic document on a graphical user interface, wherein the one or more presentation parameters include at least one of the following: one or more functionalities associated with the electronic document, one or more document appearance parameters defining appearance of the electronic document on the graphical user interface, one or more interface appearance parameters defining appearance of the one or more electronic interfaces, or any combination thereof;

generate one or more electronic interfaces embedding the electronic document, wherein the one or more electronic interfaces capture the electronic document in accordance with the one or more presentation parameters;

present the one or more electronic interfaces on the graphical user interface with the electronic document embedded in the one or more electronic interfaces;

store the captured electronic document in one or more storage locations communicatively coupled to the at least one processor.

9. The system of claim 8, wherein the at least one processor is further configured to upon receiving a request to modify the electronic document and determining the request to be an authorized request, modify the electronic document and capturing the modified electronic document; and upon determining the request to be an unauthorized request, prevent modifying of the electronic document.

10. The system of claim 9, wherein the at least one processor is further configured to associate the captured modified electronic document with the stored captured electronic document; and store the captured modified electronic document with the stored captured electronic document.

11. The system of claim 8, wherein the one or more functionalities include at least one of the following: a signing functionality associated with the electronic document, a revision functionality associated with the electronic document, a review functionality associated with the electronic document, a negotiation functionality associated with the electronic document, and any combination thereof.

12. The system of claim 8, wherein the one or more document appearance parameters include at least one of the following: a page size of the electronic document, a size of text in the electronic document, a font of text in the electronic document, and any combination thereof.

13. The system of claim 9, wherein the at least one processor is further configured to retrieve, in response to the detecting, one or more document authorization parameters associated with the electronic document;

compare the one or more document authorization parameters with one or more request authorization parameters;

upon matching the one or more document authorization parameters and the one or more request authorization parameters, modify the electronic document and capturing the modified electronic document; and upon failing the one or more document authorization parameters and the one or more request authorization parameters, prevent modifying of the electronic document.

14. A computer program product comprising a non-transitory machine-readable medium storing instructions that, when executed by at least one programmable processor, cause the at least one programmable processor to:

receive an electronic document and one or more presentation parameters associated with presentation of the electronic document on a graphical user interface, wherein the one or more presentation parameters include at least one of the following: one or more functionalities associated with the electronic document, one or more document appearance parameters defining appearance of the electronic document on the graphical user interface, one or more interface appearance parameters defining appearance of the one or more electronic interfaces, or any combination thereof, generate one or more electronic interfaces embedding the electronic document, wherein the one or more electronic interfaces capture the electronic document in accordance with the one or more presentation parameters;

present the one or more electronic interfaces on the graphical user interface with the electronic document embedded in the one or more electronic interfaces;

modify, via the one or more electronic interfaces, the electronic document and capture the modified electronic document;

associate the captured modified electronic document with the captured electronic document; and store the captured modified electronic document with the captured electronic document.

15. The computer program product of claim 14, wherein the at least one processor is further configured to store the captured electronic document in one or more storage locations communicatively coupled to the at least one processor.

16. The computer program product of claim 15, wherein the at least one processor is further configured to receive a request to modify the electronic document;

upon determining the request to be an authorized request, modify the electronic document and capturing the modified electronic document; and upon determining the request to be an unauthorized request, prevent modifying of the electronic document.

17. The computer program product of claim 14, wherein the one or more functionalities include at least one of the following: a signing functionality associated with the electronic document, a revision functionality associated with the electronic document, a review functionality associated with the electronic document, a negotiation functionality associated with the electronic document, and any combination thereof;

wherein the one or more document appearance parameters include at least one of the following: a page size of the electronic document, a size of text in the electronic document, a font of text in the electronic document, and any combination thereof.

18. The computer program product of claim 16, wherein the at least one processor is further configured to retrieve, in response to the the request, one or more document authorization parameters associated with the electronic document;

compare the one or more document authorization parameters with one or more request authorization parameters;

upon matching the one or more document authorization parameters and the one or more request authorization parameters, modify the electronic document and capturing the modified electronic document; and upon failing the one or more document authorization parameters and the one or more request authorization parameters, prevent modifying of the electronic document.

* * * * *